United States Patent
Uchiyama et al.

(10) Patent No.: US 7,060,969 B2
(45) Date of Patent: Jun. 13, 2006

(54) ROTATING MACHINE HAVING ROTATION SENSORS

(75) Inventors: Haruhiko Uchiyama, Kosai (JP); Hidehiko Natsume, Kosai (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 0 days.

(21) Appl. No.: 10/983,682

(22) Filed: Nov. 9, 2004

(65) Prior Publication Data

US 2005/0168187 A1    Aug. 4, 2005

(30) Foreign Application Priority Data

Nov. 13, 2003  (JP) .............................. 2003-383643

(51) Int. Cl.
   *G01D 5/247*   (2006.01)
   *G01D 5/30*    (2006.01)

(52) U.S. Cl. .......................... 250/231.16; 250/231.13; 250/231.14; 250/231.15; 318/633; 318/640; 318/652; 341/13

(58) Field of Classification Search ............................... 250/231.13–231.16; 318/633, 640, 652, 772; 341/13

See application file for complete search history.

(56) References Cited

U.S. PATENT DOCUMENTS

| | | | |
|---|---|---|---|
| 4,064,504 A * | 12/1977 | Lepetit et al. ................. 341/13 |
| 4,417,141 A * | 11/1983 | Phillips .................. 250/231.14 |
| 4,450,403 A * | 5/1984 | Dreiseitl et al. ............. 324/166 |
| 4,567,462 A * | 1/1986 | Leiby .......................... 341/13 |
| 4,644,157 A * | 2/1987 | Ozawa et al. .......... 250/231.16 |
| 4,714,936 A * | 12/1987 | Helinski et al. ............... 347/38 |
| 4,975,570 A * | 12/1990 | Nishimura et al. .... 250/231.16 |
| 4,987,301 A * | 1/1991 | Nakamura ............. 250/231.16 |
| 4,990,767 A * | 2/1991 | Ernst et al. ............ 250/231.16 |
| 5,006,703 A * | 4/1991 | Shikunami et al. .... 250/231.13 |
| 5,036,265 A * | 7/1991 | Weihrich et al. ............. 318/618 |
| 5,103,225 A * | 4/1992 | Dolan et al. ................... 341/13 |
| 5,153,437 A * | 10/1992 | Nishii et al. ........... 250/231.14 |
| 5,202,842 A * | 4/1993 | Suzuki ....................... 702/151 |
| 5,233,355 A * | 8/1993 | Di Stefano et al. ......... 341/187 |
| 5,235,177 A * | 8/1993 | Hutchinson et al. ........ 250/225 |
| 5,519,393 A * | 5/1996 | Brandestini .................. 341/10 |
| 5,774,074 A * | 6/1998 | Cooper et al. ................ 341/11 |
| 5,880,683 A * | 3/1999 | Brandestini .................. 341/10 |

(Continued)

FOREIGN PATENT DOCUMENTS

JP          A-7-140844        6/1995

*Primary Examiner*—David Martin
*Assistant Examiner*—Robert W. Horn
(74) *Attorney, Agent, or Firm*—Posz Law Group, PLC

(57) ABSTRACT

Three rotation sensors circumferentially arranged at 90 degree intervals in a disk code wheel attached to a motor's output shaft respectively output a signal corresponding the rotational speed of the wheel. An error component of one period (one-periodic component) or an error component of two period (two-periodic component) is generated per rotation when the code wheel is eccentric to the output shaft or is elliptically deformed, respectively. Control means averages the signals of the first and second sensors to obtain a first correction signal and subtracts the signal of the third sensor from the signal of the first sensor to obtain a second correction signal while removing the two-periodic component. The control means subtracts or adds the first correction signal relative to the second correction signal upon coinciding these signals in phase and amplitude to calculate a rotation measurement signal from which the periodic components are removed.

12 Claims, 11 Drawing Sheets

U.S. PATENT DOCUMENTS

| | | | | |
|---|---|---|---|---|
| 5,900,709 | A * | 5/1999 | Kanda et al. | 318/652 |
| 6,017,114 | A * | 1/2000 | Elgee et al. | 347/40 |
| 6,191,415 | B1 * | 2/2001 | Stridsberg | 250/231.13 |
| 6,215,119 | B1 * | 4/2001 | Markham et al. | 250/231.14 |
| 6,331,759 | B1 * | 12/2001 | Atmur | 318/661 |
| 6,396,052 | B1 * | 5/2002 | Barry et al. | 250/231.13 |
| 6,407,678 | B1 * | 6/2002 | Elgee et al. | 341/8 |
| 6,615,156 | B1 * | 9/2003 | Elliott et al. | 702/151 |
| 6,622,391 | B1 * | 9/2003 | Shirai et al. | 33/292 |
| 6,639,207 | B1 * | 10/2003 | Yamamoto et al. | 250/231.14 |
| 6,666,375 | B1 * | 12/2003 | Harriman et al. | 235/454 |
| 6,704,683 | B1 * | 3/2004 | Hasser | 702/147 |
| 6,768,705 | B1 * | 7/2004 | Hirai | 369/44.28 |
| 6,784,417 | B1 * | 8/2004 | Sonoki | 250/231.13 |
| 6,828,783 | B1 * | 12/2004 | Schroter et al. | 324/207.25 |
| 6,893,174 | B1 * | 5/2005 | Askren et al. | 400/582 |
| 6,901,682 | B1 * | 6/2005 | Igaki et al. | 33/702 |
| 6,903,661 | B1 * | 6/2005 | Tseng | 341/2 |
| 6,909,212 | B1 * | 6/2005 | Uchiyama | 310/68 B |
| 6,935,036 | B1 * | 8/2005 | Raab et al. | 33/503 |
| 2004/0024499 | A1 * | 2/2004 | Altieri et al. | 701/3 |
| 2004/0061470 | A1 * | 4/2004 | Ito et al. | 318/565 |
| 2004/0105184 | A1 * | 6/2004 | Harada et al. | 360/51 |
| 2004/0212261 | A1 | 10/2004 | Uchiyama | |
| 2004/0232908 | A1 * | 11/2004 | Saito | 324/207.12 |
| 2005/0028393 | A1 * | 2/2005 | Raab et al. | 33/503 |
| 2005/0098715 | A1 * | 5/2005 | Kataoka | 250/231.13 |
| 2005/0104749 | A1 * | 5/2005 | Tokue | 341/13 |
| 2005/0253054 | A1 * | 11/2005 | Guarino | 250/231.14 |

* cited by examiner

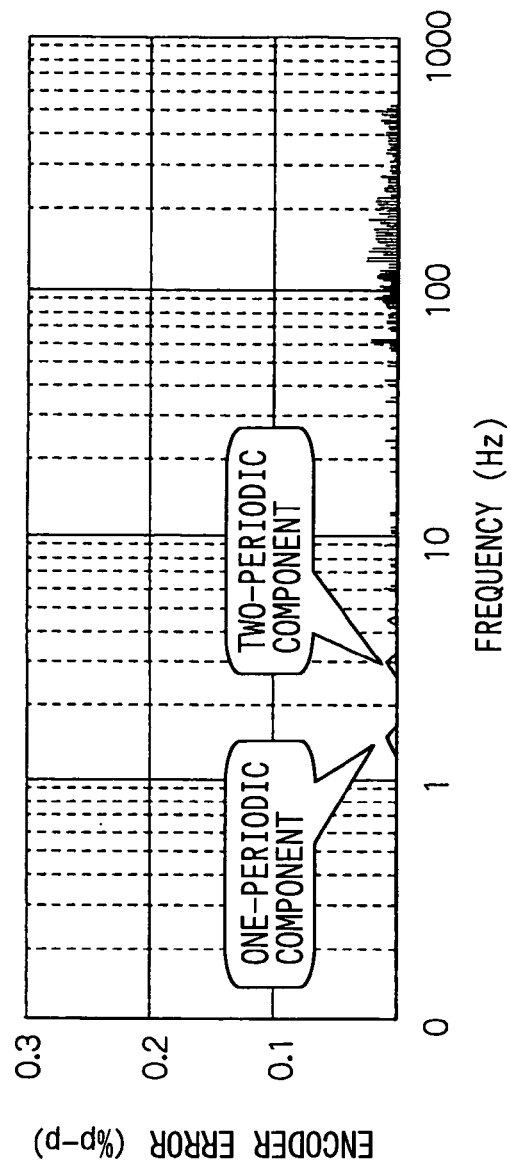
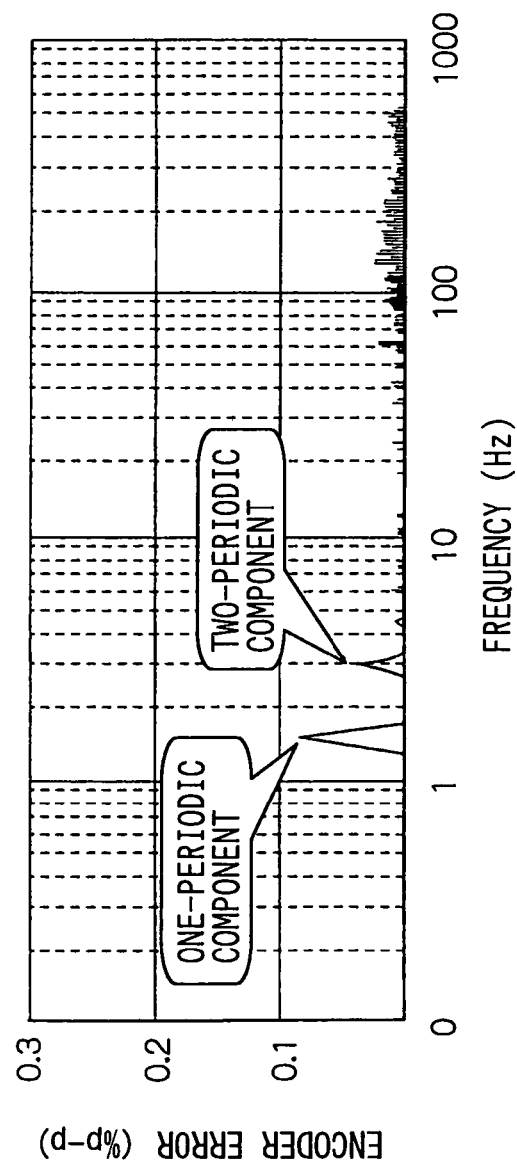
FIG. 8A
FIG. 8B

ROTATING MACHINE HAVING ROTATION SENSORS

CROSS REFERENCE TO RELATED APPLICATION

This application is based on and incorporates herein by reference Japanese Patent Application No. 2003-383643 filed on Nov. 13, 2003 and Japanese Patent Application No. 2004-295267 filed on Oct. 7, 2004.

BACKGROUND OF THE INVENTION

1. Field of the Invention

The present invention relates to a rotating machine, which is capable of controlling a rotational speed or a rotational angle of a rotatable shaft or of a rotated body connected to the rotatable shaft.

2. Description of Related Art

For example, an image processor (image forming apparatus), such as a color copying machine, a color printer, has respective photoconductor drums of four colors (black, yellow, blue and red). Each of these photoconductor drums is rotated at a low speed (40 rpm to 100 rpm) by a corresponding electric motor, which serves as a rotating machine. In the motor for rotating and operating the photoconductor drum, it is desirable to eliminate rotational irregularities (rotational speed fluctuations), which cause a deterioration of an image quality, at the above low rotational speed.

Therefore, an encoder, which senses a rotational speed of a rotatable shaft of the motor or of a connecting shaft of the photoconductor drum connected to this rotatable shaft, is provided. The rotational speed of the photoconductor drum (the motor's rotatable shaft or the connecting shaft) is controlled based on an output signal of the encoder. An optical type encoder has been adopted as the above encoder. In this encoder, for example, an encoder plate, which forms an optical pattern constructed by multiple slits arranged at equal intervals in the circumferential direction, is coaxially attached to the above rotatable shaft. A light emitting element and a light receiving element (hereinafter collectively called a rotation sensing device) are arranged such that the optical pattern is interposed between the light emitting element and the light receiving element. The rotation sensing device outputs a pulse signal (ON/OFF signal) according to the presence of light reception caused by rotating the encoder plate.

A construction, which includes two rotation sensing devices provided to a single encoder plate, is known to improve rotational detection accuracy using the encoder (e.g., see JP-A-7-140844). Specifically, as shown in FIG. 11A and FIG. 11B, the encoder 200 includes an encoder plate 204, multiple slits (an optical pattern) 204A and two rotation sensing devices 206, 208. The encoder plate 204 is coaxially secured to a rotatable shaft 202 and is rotated integrally with the rotatable shaft 202. The slits 204A are arranged at equal intervals in the circumferential direction in the vicinity of the outer circumference edge of the encoder plate 204. The rotation sensing devices 206, 208 are arranged at two points, which are symmetrical with respect to the axis of the rotatable shaft 202.

A control device, which is electrically connected to the encoder 200, is constructed such that output signals of the rotation sensing devices 206, 208 are respectively inputted to the control device. An influence, such as an attachment error (eccentricity) of the encoder plate 204 relative to the rotatable shaft 202, is removed by averaging these output signals. Namely, since a rotational detection error, which is caused by the above attachment error and has a sine wave form, occurs once per rotation of the rotatable shaft 202, the influence is removed by averaging the output signals of the two rotation sensing devices 206, 208, which are arranged in the corresponding positions opposed to each other by 180 degrees. Thus, in the above construction (rotation detecting method) having the encoder 200 and the control device, the true rotational speed (angular velocity), from which an error component caused by the above attachment error is removed, is obtained.

For example, when the encoder plate 204 is made from inexpensive polyethylene terephthalate (PET), a distortion could occur due to a difference between longitudinal and transversal expansion coefficients in this encoder plate 204, so that the encoder plate 204 is deformed approximately in an elliptical shape. This deformation of the encoder plate 204 made of the PET becomes notable under a high temperature environment of about 70 degrees Celsius. Since the rotational detection error, which is caused by such deformation of the encoder plate 204 and has the sine wave form, occurs twice per rotation of the rotatable shaft 202, this rotational detection error cannot be removed by the above conventional technique. Therefore, in the encoder 200 used under the high temperature environment, it was conventionally necessary to take a countermeasure using, for example, the expensive encoder plate 204 made of glass.

SUMMARY OF THE INVENTION

In consideration of the above fact, it is an objective of the present invention to provide a rotating machine, which is capable of relatively accurately sensing a rotational speed or a rotational angle of a sensing object, to which a sensing object member is attached, by removing an error component of one period, which occurs per rotation of the sensing object member, and an error component of two period, which occurs per rotation of the sensing object member.

To achieve the objective of the present invention, there is provided a rotating machine, which includes a rotatable shaft, a sensing object member, at least three rotation sensing devices and a control means. The sensing object member is disk-shaped and is rotated integrally with the rotatable shaft. The at least three rotation sensing devices are placed adjacent to the sensing object member and are arranged one after another at 90 degree intervals in a circumferential direction of the sensing object member. Each rotation sensing device generates an output signal, which corresponds to one of a rotational speed and a rotational angle of the sensing object member. The control means is for controlling one of a rotational speed and a rotational angle of the rotatable shaft based on a rotation measurement signal, which is obtained from the output signals of the at least three rotation sensing devices in such a manner that a two-periodic error component and a one-periodic error component are both eliminated from the rotation measurement signal.

BRIEF DESCRIPTION OF THE DRAWINGS

The invention, together with additional objectives, features and advantages thereof, will be best understood from the following description, the appended claims and the accompanying drawings in which:

FIG. 8A is a diagram showing an FFT waveform provided by Fourier-transforming the rotational speed detecting result using the arithmetic operation of the CPU in the embodiment of the present invention at high speed;

FIG. 8B is a diagram showing an FFT waveform provided by Fourier-transforming the raw waveform of the rotation sensor shown for comparison at high speed;

DETAILED DESCRIPTION OF THE INVENTION

An outer rotor type motor 10, which serves as an electric motor (rotating machine), according to an embodiment of the present invention will be explained on the basis of FIGS. 1 to 8B. First, the entire schematic construction of a motor unit 10A of the outer rotor type motor 10 will be explained. Next, a rotation control unit 10B, which serves as a rotation control device that constitutes a main feature of the present invention, will be explained.

Figure 1:
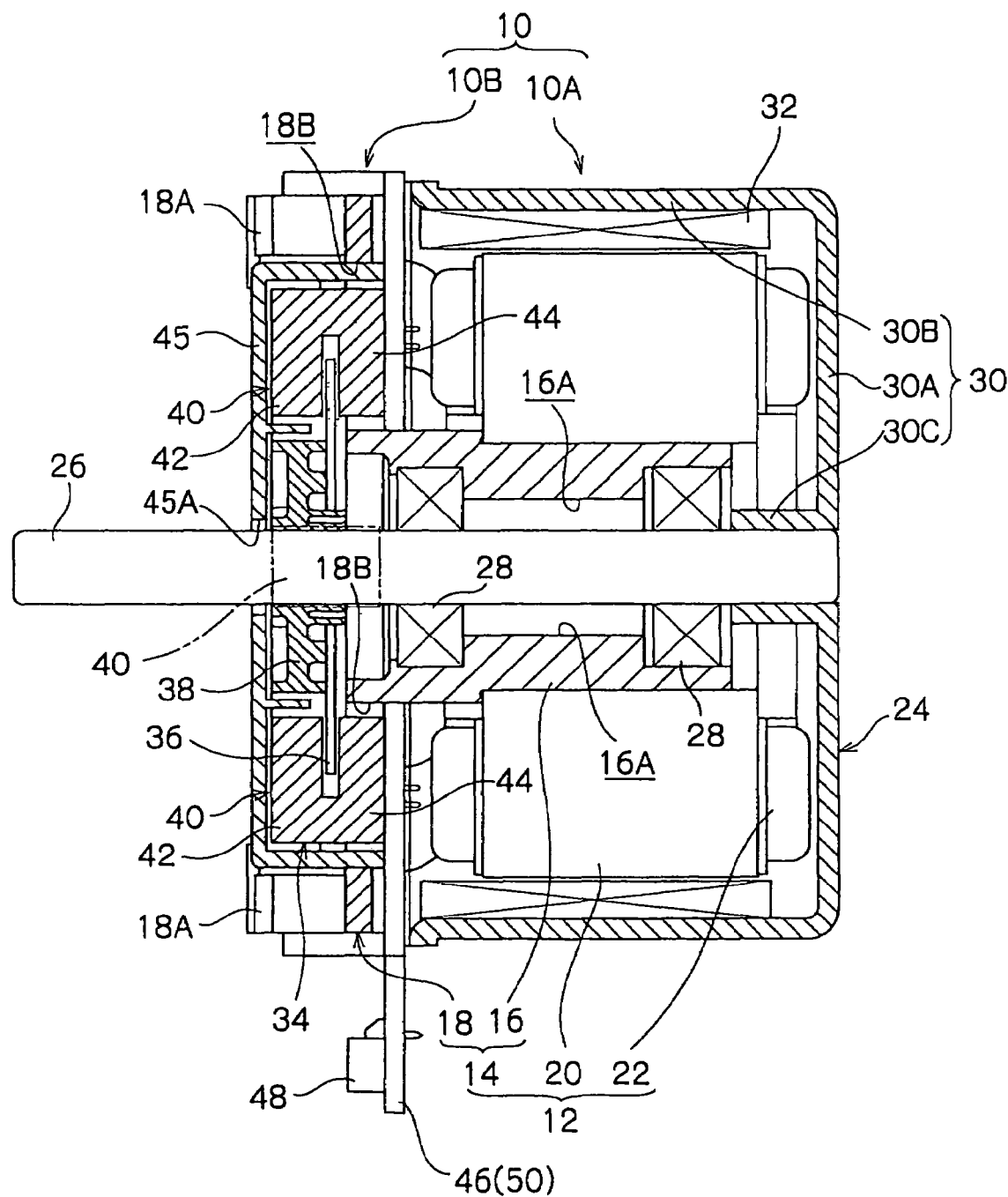
FIG. 1 is a side sectional view showing the schematic construction of an outer rotor type motor in accordance with an embodiment of the present invention.

In FIG. 1, the outer rotor type motor 10 is shown in a side section. As shown in this figure, the outer rotor type motor 10 includes the motor unit 10A and the rotation control unit 10B described later. The motor unit 10A has a stator 12, and the stator 12 has a stator base 14. The stator base 14 includes a tubular center portion 16 and a stator housing 18. The tubular center portion 16 has a generally cylindrical shape. The stator housing 18 is shaped into a flat plate form and projects from an outer peripheral portion of the tubular center portion 16 at an end of the tubular center portion 16 in a direction perpendicular to an axial direction.

A stator core 20 is securely attached to the outer peripheral portion of the tubular center portion 16 by press-fitting, adhesion, or screw fastening, etc. Coils 22 are wound around the stator core 20. Furthermore, a shaft hole 16A is formed in the tubular center portion 16 to extend through the tubular center portion 16 in the axial direction. The stator housing 18 has multiple attaching portions 18A projected on the side opposed to the tubular center portion 16 side, and each attaching portion 18A is arranged for fixation to a corresponding device. Furthermore, multiple (three in this embodiment) sensor holes 18B, each of which extends in the plate thickness direction on the radially outer side of the tubular center portion 16, are formed in the stator housing 18.

The outer rotor type motor 10 further includes a rotor 24 and an output shaft 26 rotated integrally with the rotor 24. The output shaft 26 is coaxially and rotatably supported with respect to the tubular center portion 16 through two bearings 28 arranged within the shaft hole 16A of the tubular center portion 16. Each of end portions of the output shaft 26 is projected from the shaft hole 16A (stator 12). The output shaft 26 is a control object for controlling the rotational speed through the rotation control unit 10B and corresponds to a rotatable shaft or a rotatable body of the present invention.

The rotor 24 has a rotor housing 30 and magnets 32 securely attached to the rotor housing 30. The rotor housing 30 is formed generally into a cup shape. The rotor housing 30 has a bottom portion 30A, a cylindrical portion 30B and a cylindrical boss portion 30C. The cylindrical portion 30B extends from an outer peripheral edge of the bottom portion 30A. The cylindrical boss portion 30C is formed in an axial center of the bottom portion 30A. The rotor housing 30 is coaxially fixed to the output shaft 26 upon insertion of the output shaft 26 into the boss portion 30C. Furthermore, the cylindrical portion 30B covers the coils 22 of the stator 12 at the location radially outward of the coils 22. The magnets 32 are securely attached to the inner face of the cylindrical portion 30B and are opposed to the coils 22.

As mentioned above, the outer rotor type motor 10 of this embodiment is formed as a brushless motor having the magnet rotor. When an electric current is supplied to the coils 22, the rotor 24 and the output shaft 26 are rotated with respect to the stator 12, which is fixed in the device, by magnetic force of the coils 22 and the magnets 32.

This outer rotor type motor 10 has the rotation control unit 10B, which serves as a rotation control device for controlling the rotational speed of the output shaft 26. The rotation control unit 10B includes an encoder 34 and a controller 50 (see FIG. 4) as its main constructional components. The encoder 34 is for detecting the rotational speed of the output shaft 26, and the controller 50 is for controlling the rotational speed of the output shaft 26 on the basis of the output of the encoder 34.

The encoder 34 has a code wheel 36, which serves as a sensing object member. The code wheel 36 is coaxially fixed to the output shaft 26 and constitutes a sensing object for sensing the rotational speed of the output shaft 26. Specifically, the code wheel 36 is formed in an annular plate shape (a disk shape, i.e., a circular disk shape), and a boss member 38 is securely connected to an axial center of the code wheel 36. The code wheel 36 is attached to the output shaft 26 so as to be coaxially and integrally rotatable by fitting and attaching this boss member 38 to the output shaft 26. In this state, the code wheel 36 is located on the side opposed to the tubular center portion 16 with respect to the stator housing 18.

Figure 2A:
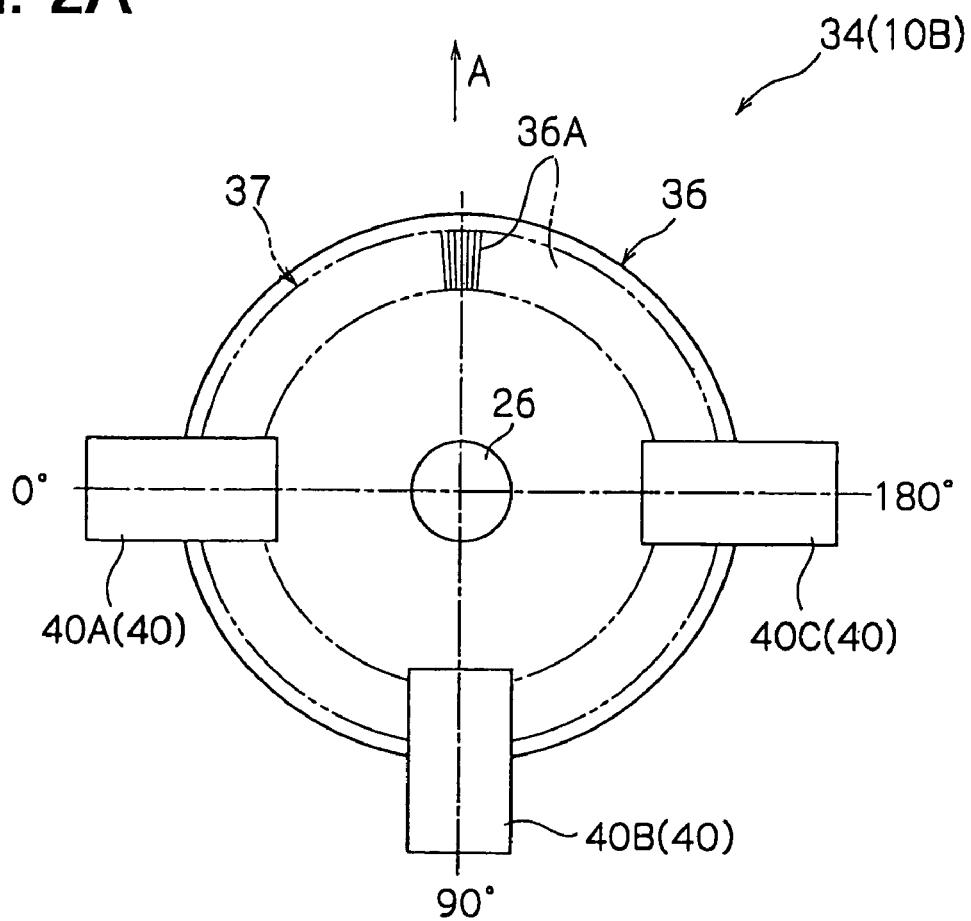
FIG. 2A is a front view showing an encoder constituting the outer rotor type motor in the embodiment of the present invention.
Figure 3A:
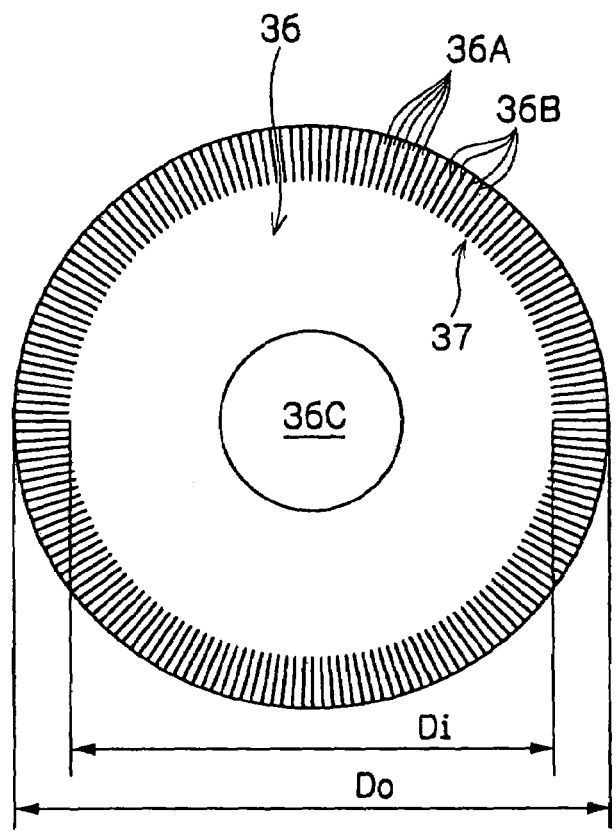
FIG. 3A is a front view showing an entire code wheel constituting the outer rotor type motor in the embodiment of the present invention.

As shown in FIG. 2A and FIG. 3A, a predetermined number of slits 36A are formed over the entire circumference at equal intervals in the circumferential direction in the vicinity of the outer peripheral edge of the code wheel 36. The slits 36A constitute an optical pattern 37, which serves as a sensing pattern. Each slit 36A is formed to transmit light in the plate thickness direction of the code wheel 36. In this embodiment, the number of slits 36A is set to 1500.

Figure 3B:
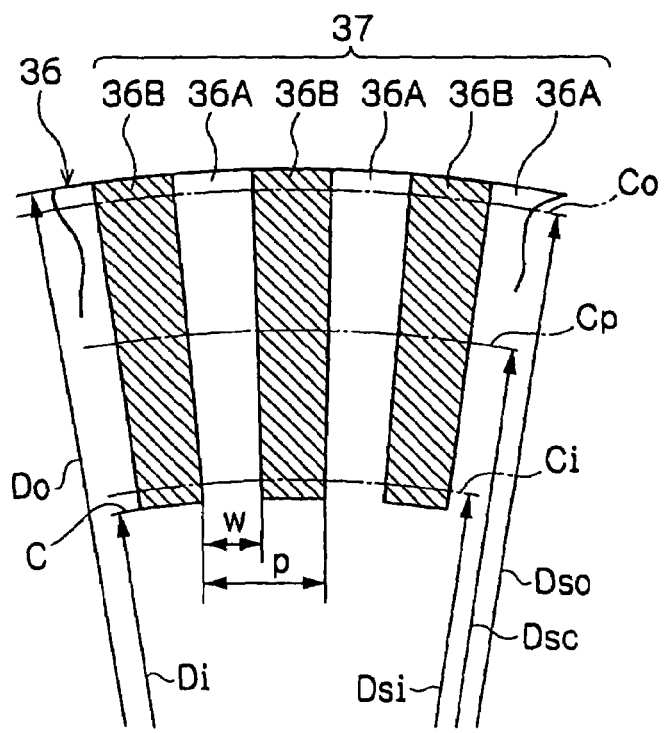
FIG. 3B is a front view enlargedly showing one portion of FIG. 3A.

The above construction will be more specifically explained. The code wheel 36 is made of polyethylene terephthalate (hereinafter referred to as PET), which is a transparent resin material. Light non-transmitting portions 36B, which are formed as a predetermined number (1500) of light shading portions, are arranged in the vicinity of the outer peripheral edge of the code wheel 36 at equal intervals in the circumferential direction over the entire circumference. Thus, each slit 36A, which serves as a light conducting portion that constitutes a light transmitting portion, is formed between the respective adjacent light non-transmitting portions 36B. In this embodiment, each light non-transmitting portion 36B is opaquely formed by printing the light non-transmitting portion 36B on the surface of the code wheel 36 by opaque ink, etc. As shown in FIG. 3B, a radially outer edge of each light non-transmitting portion 36B is defined by the outer peripheral edge of the code wheel 36, and a radially inner edge of each light non-transmitting portion 36B is formed as an arcuate edge, which extends along an imaginary circle C that is coaxial with the code wheel 36. Furthermore, each of the circumferential edges of the light non-transmitting portion 36B is shaped to extend linearly in the radial direction (radiating direction) of the code wheel 36. Thus, each light non-transmitting portion 36B has a corresponding shape, which is formed upon removing a fan shaped radially inner part by an analogous fan shape. Each slit 36A, which is formed generally in the same shape as the light non-transmitting portion 36B, is formed between the respective adjacent light non-transmitting portions 36B by arranging the light non-transmitting portions 36B, which are formed in the same shape, at equal intervals in the circumferential direction at a pitch, which is twice the circumferential width of the light non-transmitting portion 36B.

In this embodiment, the outer diameter Do of the code wheel 36 is set to 44.5 mm. Furthermore, the diameter Di of the above imaginary circle C, which connects the radially inner edges of the respective light non-transmitting portions 36B, is set to 36.5 mm. In addition, the widths W and the pitches P (=2W) of each slit 36A in the circumferential direction of the code wheel 36 are set as follows at the corresponding radial points of the code wheel 36. The width W=42.3 μm and the pitch P=84.7 μm of each slit 36A are set at the corresponding radial point, through which a pitch circle Cp (having the diameter Dsc=40.425 mm) extends. The pitch circle Cp is coaxial with the code wheel 36 and connects the radial central portion of each slit 36A (light non-transmitting portion 36B). Furthermore, the width W=38.7 μM and the pitch P=77.5 μm of each slit 36A are set at the corresponding radial point, through which an imaginary circle Ci (having the diameter Dsi=diameter 37 mm) extends. The imaginary circle Ci is coaxial with the code wheel 36 and passes through the radial point that is in the vicinity of the radial inner edge of each slit 36A. Furthermore, the width W=46.1 μm and the pitch P=92.2 μm of each slit 36A are set at the corresponding radial point, through which an imaginary circle Co (having the diameter Dso=diameter 44 mm) extends. The imaginary circle Co is coaxial with the code wheel 36 and passes through the radial point that is in the vicinity of the radial outer edge of each slit 36A. Accordingly, as mentioned above, each slit 36A (light non-transmitting portion 36B), which is formed upon removing the fan shaped radially inner part by the analogous fan shape, is formed into the shape that can be substantially evaluated as a generally rectangular shape (an oblong shape).

1500 slits 36A are arranged per circle at the equal intervals over the entire circumference of the code wheel 36 by alternately arranging the slit 36A of the above size and the light non-transmitting portion 36B of the above size in the circumferential direction of the code wheel 36, so that the above optical pattern 37 is constructed. Furthermore, the number of slits 36A per a unit circumferential length of 25.4 mm (one inch) in the above pitch circle Cp is set to 300. In other words, the entire circumferential length of the pitch circle Cp is five inches. Thus, in this embodiment, the number of slits 36A is set to 1500, which is equal to or greater than 1000. Furthermore, the number of slits 36A per unit circumferential length is set to 300 lines/inch equal to or greater than 150 lines/inch (150/25.4 mm). Accordingly, the light non-transmitting portion 36B forming the slit 36A is also arranged by the number of 1500 per circle at a density of 300 lines/inch. A through hole 36C, which extends through the axial center of the code wheel 36 in FIG. 3A, is constructed to be fitted to the boss member 38.

Figure 2B:
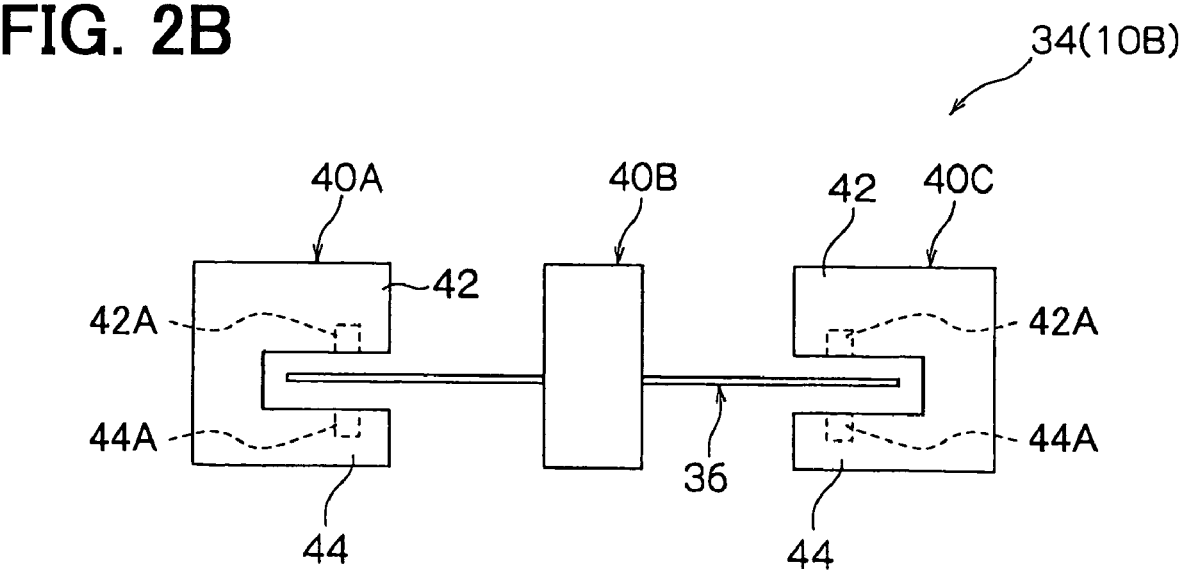
FIG. 2B is a side view showing the encoder of FIG. 2A.

The encoder 34 has three rotation sensors 40, each of which serves as a rotation sensing device for outputting a signal according to the rotational speed of the code wheel 36. As shown in FIG. 2B, each rotation sensor 40 is a transmission type photo interrupter (photo IC) is formed to have a generally U-shaped cross section and having a pair of arms 42, 44. A section of the code wheel 36, in the slits 36A are formed, is placed between the arm 42 and the arm 44 without contacting the arms 42, 44.

In each rotation sensor 40, a light emitting element (light emitter) 42A is arranged in the arm 42, and a light receiving element (light receiver) 44A is arranged in the arm 44, which is spaced from and is opposed to the arm 42. Each slit 36A, which serves as a light conducting portion of the code wheel 36, is constructed so as to conduct light irradiated from the light emitting element 42A to the light receiving element 44A when each slit 36A is positioned between the light emitting element 42A and the light receiving element 44A. When each light non-transmitting portion 36B, which serves as a light shading portion, is placed between the light emitting element 42A and the light receiving element 44A, the light non-transmitting portion 36B shades the light, which is irradiated from the light emitting element 42A toward the light receiving element 44A, to disable sensing of the light by the light receiving element 44A. Thus, each rotation sensor 40 is constructed so as to output a pulse (ON/OFF) signal according to whether or not the light emitted from the light emitting element 42A passes through the slit 36A and is received by the light receiving element 44A. Accordingly, each rotation sensor 40 is set so as to generate 1500 pulses per rotation (360°) of the output shaft 26. This pulse number corresponds to the rotational angle of the code wheel 36. The pulse width (switching time of ON/OFF) or the pulse number per unit time corresponds to the rotational speed of the code wheel 36.

These rotation sensors 40 are respectively mounted to a substrate 46, and the substrate 46 is fixed to the face of the tubular center portion 16 side in the stator housing 18. Thus, each rotation sensor 40 is not moved with respect to the stator 12. Furthermore, each rotation sensor 40 is inserted into a sensor hole 18B of the stator housing 18, and a forming part of the slit 36A of the code wheel 36 is inserted between the respective arms 42 and 44. Thus, each rotation sensor 40 outputs a pulse signal according to the rotational speed of the code wheel 36, which is relatively moved between the arms 42 and 44 by rotating the output shaft 26.

As shown in FIG. 2A, the rotation sensors 40 are arranged at 90 degree intervals in the circumferential direction of the code wheel 36 while the rotation sensors 40 are directed toward the axis of the output shaft 26. Hereinafter, in the case where the rotation sensors 40 are explained individually, the rotation sensor 40, which is positioned at a relative angle of 0 degree in FIG. 2A, will be referred to as a first rotation sensor 40A. Also, the rotation sensor 40, which is positioned at a relative angle of 90 degree, will be referred to as a second rotation sensor 40B. Furthermore, the rotation sensor 40, which is arranged at a relative angle of 180 degrees, will be referred to as a third rotation sensor 40C.

The outer rotor type motor 10 has a cover member 45, which covers the encoder 34. The cover member 45 is fitted to the inner edge of the sensor hole 18B in the stator housing 18 and is fixed to the stator 12 in a state in which the output shaft 26 is projected from a through hole 45A arranged in the axial center. Thus, the invasion of light and foreign matters from the exterior is prevented by the cover member 45 in the encoder 34 (a rotational speed detecting part for detecting the rotational speed of the code wheel 36 through the respective rotation sensors 40).

In the substrate 46, to which each rotation sensor 40 is mounted, a notch or an elongated hole for allowing the movement of the tubular center portion 16 of the stator 12 in the direction perpendicular to the axis is formed. The sensor hole 18B of the stator housing 18 is formed as an elongated hole for allowing the movement of the rotation sensor 40 along the moving direction of the above tubular center portion 16. Thus, the tubular center portion 16 is inserted into the notch or the elongated hole of the substrate 46, to which each rotation sensor 40 is mounted in such a manner that each rotation sensor 40 does not interface with the code wheel 36. Thereafter, the substrate 46 is moved in the direction (the direction of an arrow A shown in FIG. 2A) perpendicular to the axis of the output shaft 26 with respect to the stator 12. Thus, the code wheel 36 can be inserted between the arms 42 and 44 of each rotation sensor 40. Instead of this construction, it is also possible to adopt a construction in which the substrate 46 is divided into multiple portions.

A connector 48 is also provided in the substrate 46, to which each rotation sensor 40 is mounted. The connector 48 is electrically connected to an external power source (not shown) through a wiring (not shown) having a corresponding connector. All electric parts, which are required to drive and control the outer rotor type motor 10 (the motor unit 10A), are mounted to the substrate 46. These electric parts includes, for example, a Hall element (not shown), which senses a magnetic pole position of the rotor 24, and a controller 50, which controls power supply to the coils 22. Among these electric components mounted to the substrate 46, the electric components, which are used to drive the motor unit 10A, may be classified as the components of the motor unit 10A.

Figure 4:
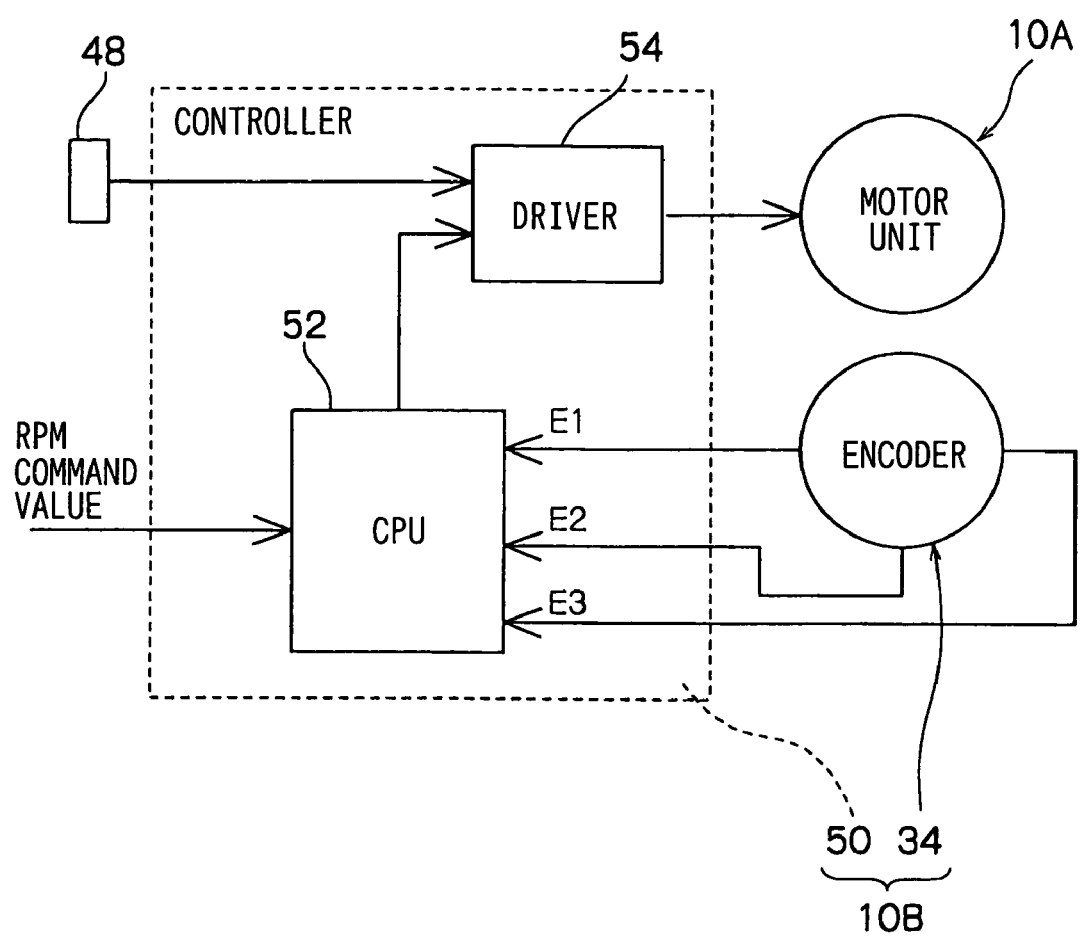
FIG. 4 is a block diagram showing the schematic electric construction of the outer rotor type motor in the embodiment of the present invention.

As shown in FIG. 4, the controller 50 includes a driver 54 and a CPU 52, which serves as an arithmetic device. The driver 54 is electrically connected to each of the coils 22 of the motor unit 10A and the external power source (connector 48) so as to supply an electric current to the coils 22. The CPU 52 receives an output signal from each rotation sensor 40 and a rotation number command signal (an rpm command signal) from an external device. Then, based on such information, the CPU 52 controls on and off of the supply of electric current to the coils 22 as well as the amount of electric current to the coils 22.

That is, the CPU 52 detects the rotational speed of the output shaft 26 on the basis of the output signal of each rotation sensor 40. Then, the CPU 52 compares the detected result with the rotation number command signal and controls (through feedback-control) the driver 54, so that the driver 54 supplies the electric current to the coils 22 in a manner that reduces the difference between the detected result and the rotation number command signal. The detection of the rotational speed of the output shaft 26 using the CPU 52 will next be explained in detail. In the following explanation, the output signal of the first rotation sensor 40A will be referred to as E1, and the output signal of the second rotation sensor 40B will be referred to as E2, and the output signal of the third rotation sensor 40C will be referred to as E3.

Here, if the rotation center of the code wheel 36 and the rotation center of the output shaft 26 perfectly coincide to each other, and the slits 36A are arranged along a complete circle centered at the rotation center of the code wheel 36 and of the output shaft 26, the output signals E1, E2, E3 of the respective rotation sensors 40 accurately correspond to the true rotational speed of the output shaft 26.

Figures 5A, 5B:
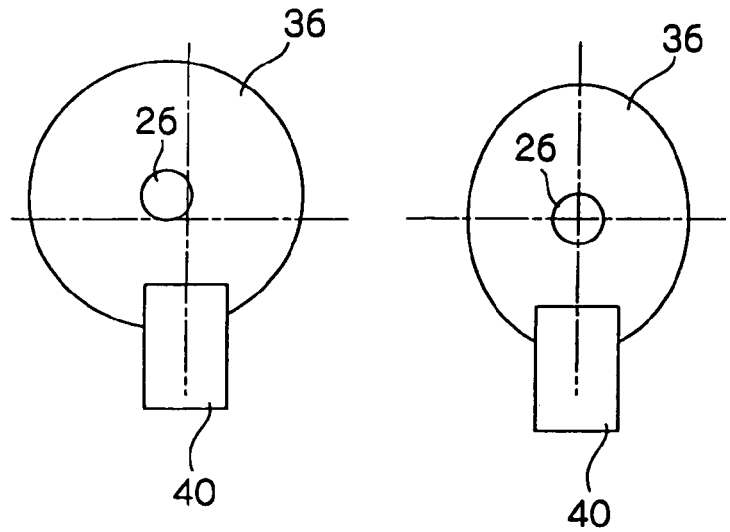
FIG. 5A is a front view showing an eccentric state of the code wheel.
FIG. 5B is a front view showing elliptical formation of the code wheel.

However, when there is an axial displacement between the output shaft 26 and the code wheel 36, which is a circular disk as shown in FIG. 5A, a sine wave shaped error component (hereinafter called a one-periodic component or a one-periodic error component) of one period occurs per rotation (1500 pulses) of the output shaft 26, as shown by the solid line in FIG. 5C. Furthermore, for example, when the code wheel 36 (slit 36A) is elliptically formed and is changed to an elliptical disk by distortion as shown in FIG. 5B, a sine wave shaped error component (hereafter called a two-periodic component or a two-periodic error component) of two periods occurs per rotation of the output shaft 26, as shown by the two-dotted chain line in FIG. 5C. Accordingly, when the rotational angle of the output shaft 26 is set to $\theta$, the one-periodic component can be represented as $A \sin \theta$, and the two-periodic component can be represented as $B \sin 2(\theta+\alpha)$ when the phase difference between the one-periodic component and the two-periodic component is set to $\alpha$.

For example, the displacement between the axis of the code wheel 36 and the axis of the output shaft 26 occurs due to, for example, an attachment error of the code wheel 36 to the output shaft 26. The elliptical deformation (distortion) of the code wheel 36 becomes notable under a high temperature environment when the code wheel 36 is constructed by, for example, a material, which shows a difference between its longitudinal expansion coefficient and its transverse expansion coefficient. The code wheel 36 in this embodiment is constructed by PET. Therefore, the longitudinal and transversal thermal expansion coefficients are different from each other, and the elliptical deformation is easily caused under an environment of 70 degrees Celsius or higher.

Figure 5C:
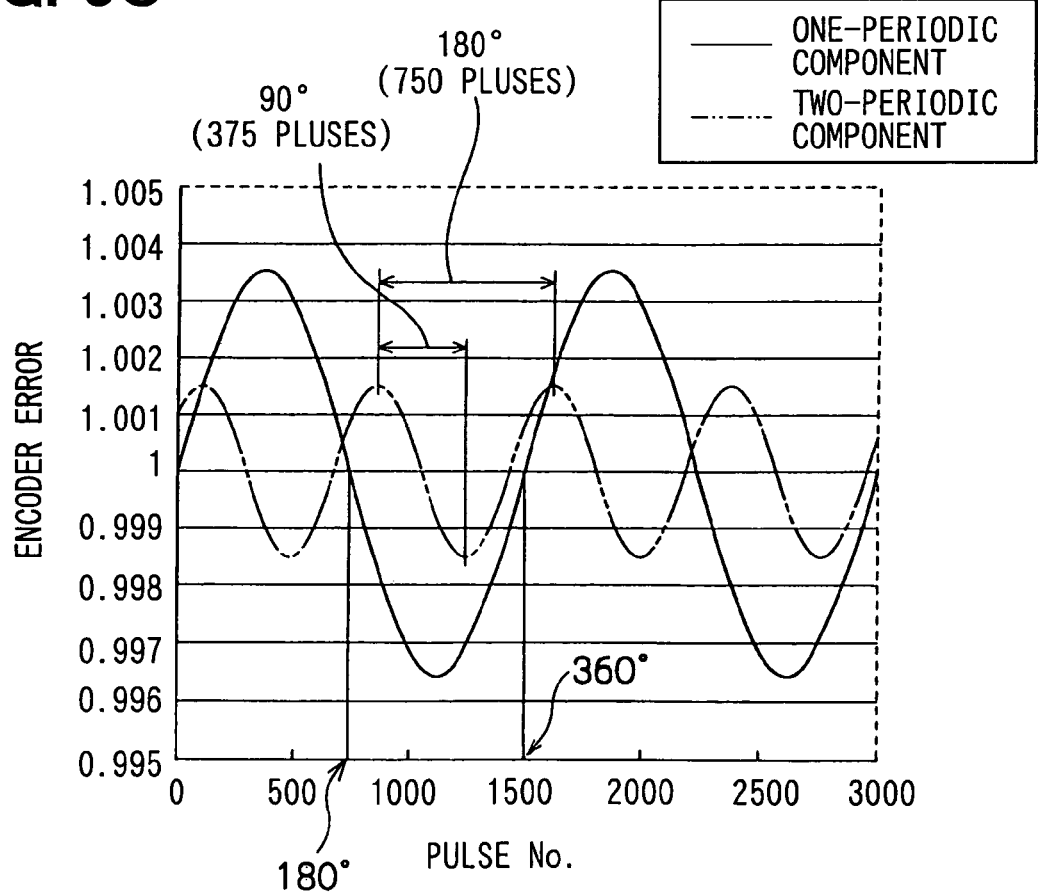
FIG. 5C is a diagram divisionally showing a one-periodic component and a two-periodic component among an error component included in rotation of the code wheel.

In FIG. 5C, the axis of ordinate shows an error amount, which is obtained when a reference pulse width (e.g., time of one period of the pulse signal having no error at the time of rotating the rotatable shaft at a constant speed) is set to 1. The axis of abscissa shows an accumulating pulse number detected by the rotation sensor 40. FIG. 5C shows the one-periodic component and the two-periodic component included in the output signal (raw waveform) of the single rotation sensor 40 (first rotation sensor 40A in relation with the FIG. 6B) at the time where an error peak of the one-periodic component is 0.35% (maximum amplitude A=0.0035) of the reference pulse width, and an error peak of the two-periodic component is 0.15% (maximum amplitude B=0.0015) of the reference pulse width.

Figure 6A:
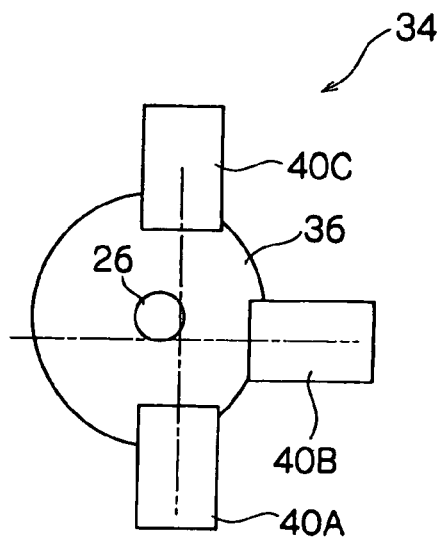
FIG. 6A is a front view showing the arrangement of each rotation sensor in a state in which the code wheel of the encoder constituting the outer rotor type motor in the embodiment of the present invention is eccentric with respect to the rotatable shaft and is deformed.
Figure 6B:
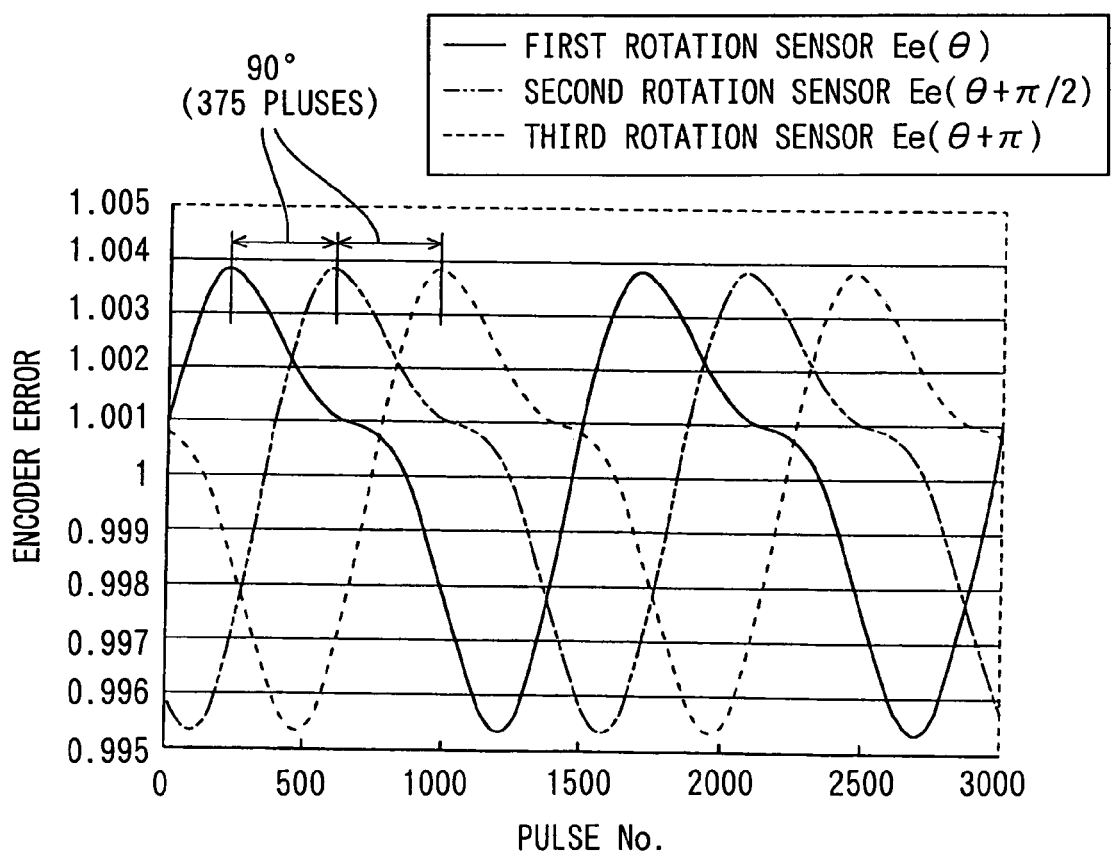
FIG. 6B is a diagram showing an output signal of each rotation sensor.

Thus, when the code wheel 36 is eccentric with respect to the output shaft 26 and is elliptically formed as shown in FIG. 6A, an error waveform Ee provided by overlapping the one-periodic component and the two-periodic component is caused as shown in FIG. 6B. In the error waveforms Ee included in the output signals E1, E2, E3 of the respective rotation sensors 40A, 40B, 40C, their phases are shifted every 90° by the arrangement of the respective rotation sensors 40A, 40B, 40C, and these error waveforms are respectively represented by $Ee(\theta)$, $Ee(\theta+\pi/2)$ and $Ee(\theta+\pi)$.

The CPU 52 executably stores the formula (1) shown as follows. A rotation measurement signal $P(\theta)$, from which the one-periodic component and the two-periodic component therefrom are removed, is calculated by executing the arithmetic calculation of the formula (1) using the signals E1, E2, E3 inputted from the respective rotation sensors 40.

$$P(\theta)=\{E1(\theta)+E2(\theta)\}/2-\sqrt{2}/4\times\{E1(\theta+\pi/4)-E3(\theta+\pi/4)\} \quad \text{formula (1)}$$

In the first term on the right-hand side of the formula (1), the signal E1 of the first rotation sensor 40A and the signal E2 of the second rotation sensor 40B arranged by shifting the phase by 90° from the first rotation sensor 40A are averaged, and this calculation result (not independently calculated) corresponds to a first correction signal in the present invention. In the first term on the right-hand side of this formula (1), as shown in FIG. 5C, two points, which have a phase difference of 90° (375 pulses) corresponding to a half period in the two-periodic component of the sine wave shape, have the same magnitude but have opposite positive and negative signs, respectively (the phase difference between a local maximum and a local minimum is 90°). Accordingly, the two-periodic component is removed (canceled) by averaging the signals E1, E2 of the two rotation sensors 40A, 40B, which have the phase difference of 90° therebetween (shifting the phase by 90° and overlapping these signals).

Specifically, when the true rotational speed (hereinafter called the motor real rotational speed), which includes the difference between the rotational speed based on the rotation number command signal and the real rotational speed of the output shaft 26, i.e., a rotation error of the output shaft 26 to be detected, is set to Me, the motor real rotational speed Me does not depend on the position (phase) of each rotation sensor 40. Therefore, the signals E1, E2, which include the error component, are respectively represented as follows.

$$E1(\theta) = Ee(\theta) + Me(\theta) \quad \text{formula (2)}$$
$$= A\sin\theta + B\sin2(\theta + \alpha) + Me(\theta)$$
$$E2(\theta) = Ee(\theta + \pi/2) + Me(\theta) \quad \text{formula (3)}$$
$$= A\sin(\theta + \pi/2) + B\sin2(\theta + \alpha + \pi/2) + Me(\theta)$$

The first term on the right-hand side of the formula (1) is represented as follows by substituting each of these formulas (2) and (3) into the first term on the right-hand side of the formula (1) and calculating this first term.

$$\{E1(\theta)+E2(\theta)\}/2 = A\sin(\pi/4)\times\sin(\theta+\pi/4)+Me(\theta) \quad \text{formula (4)}$$

In this way, there is obtained a signal (first correction signal), which includes the error components, i.e., the one-periodic component and the rotation error in the motor real rotational speed Me.

On the other hand, in the second term on the right-hand side of the formula (1), the difference between the signal E1 of the first rotation sensor 40A and the signal E3 of the third rotation sensor 40C arranged by shifting the phase by 180 degrees from the first rotation sensor 40A is basically calculated. This calculation result (not independently calculated) corresponds to a second correction signal in the present invention. In this second term on the right-hand side of the formula (1), as shown in FIG. 5C, two points, which have a phase difference of 180 degrees (750 pulses) corresponding to one period in the two-periodic component of the sine wave shape, are the same in both magnitude and positive/negative sign. Therefore, the two-periodic component is removed (canceled) by calculating the difference between the signals E1 and E3 of the two rotation sensors 40A, 40C having the phase difference of 180 degrees (shifting the phase by 180 degrees and performing a subtracting operation).

Specifically, the signal E1 is represented by the above formula (2) and the signal E3 is represented as follows.

$$E3(\theta) = Ee(\theta + \pi) + Me(\theta) \quad \text{formula (5)}$$
$$= A\sin(\theta + \pi) + B\sin2(\theta + \alpha + \pi) + Me(\theta)$$

From these formulas (2) and (5), the difference between the signals E1 and E3 is represented as follows.

$$E1(\theta)-E3(\theta)=2A\sin(\theta) \quad \text{formula (6)}$$

In this way, a signal, which includes only the one-periodic component, is obtained as the error component. When the formula (6) is compared with the formula (4), it is known that the one-periodic component in the formula (6) is delayed in phase by π/4 (45°, 188 pulses in this embodiment) from the one-periodic component in the formula (4), and differs in amplitude from the one-periodic component in the formula (4) in a ratio of $\sin(\pi/4):2$, i.e., $\sqrt{2}/2:2$. Therefore, in the second term on the right-hand side of the formula (1), the phase is advanced by π/4 so as to coincide with that of the first term on the right-hand side, and a coefficient ($\sqrt{2}/4$) is multiplied so as to coincide in amplitude.

Thus, the CPU 52 is constructed such that the one-periodic component is removed (canceled) by performing the arithmetic operation of the formula (1), i.e., by subtracting the second term on the right-hand side from the first term on the right-hand side, and a rotation measurement signal $P(\theta)$, which includes only the motor real rotational speed $Me(\theta)$, is obtained.

In this embodiment, in the CPU 52, the phase of the second term on the right-hand side is shifted to the same phase as that of the first term on the right-hand side by performing the arithmetic operation of the second term on the right-hand side using data angularly located before by π/4 (188 pulses) with respect to data for calculating the first term on the right-hand side, in other words, by advancing the phase of the data located before by π/4 so as to coincide with data of the real time. Therefore, the CPU 52 always stores in its data area the data, which is obtained up to a point, which is before the current point of each of the signals E1, E3 by the amount of π/4.

This CPU 52 is constructed so as to output a control signal to the driver 54 such that the motor real rotational speed Me becomes 1 (is conformed to the reference pulse width) on the basis of the rotation measurement signal P(θ) as an arithmetic result using the formula (1), i.e., the motor real rotational speed Me. This CPU 52 corresponds to a control means, a rotation correcting section and a control section, or a rotation detecting circuit in the present invention.

For example, the outer rotor type motor 10 explained above is connected to each of the photoconductor drums of four colors (black, yellow, blue and red) constituting an image processor (image forming apparatus) such as a color copying machine, a color printer, etc. and is applied to the image processor. The outer rotor type motor 10 is constructed so as to directly rotate the photoconductor drum at a constant rotational speed (40 rpm to 100 rpm) without interposing a speed reduction gear, etc therebetween.

In the outer rotor type motor 10, a connecting shaft, which serves as a connecting portion connected with the output shaft 26 in the photoconductor drum, is connected to the output shaft 26 within the cover member 45 of the stator housing 18, and the code wheel 36 can be also constructed so as to be coaxially attached to this connecting shaft.

The operation of this embodiment will next be explained.

In the outer rotor type motor 10 of the above construction, the rotor 24, the output shaft 26 and the code wheel 36 are rotated together when the controller 50 is operated and an electric current is flowed from the driver 54 to the coils 22. At this time, each rotation sensor 40 outputs a pulse signal (ON/OFF signal) according to the rotational speed of the code wheel 36 to the CPU 52 of the controller 50 mounted to the substrate 46.

The CPU 52 calculates the formula (1) by using the signals E1, E2, E3 inputted from the respective rotation sensors 40 (makes a calculation using a signal angularly located before by π/4 with respect to the second term on the right-hand side), and obtains the rotation measurement signal P(θ), which includes only the motor real rotational speed Me. The CPU 52 then compares this rotation measurement signal P(θ), which is regarded as the real rotational speed of the output shaft 26, relative to the rotation number command signal (the rotational speed as a control target corresponding to this rotation number command signal). Thereafter, the CPU 52 outputs a control signal to the driver 54 in such a manner that the motor real rotational speed Me becomes 1. The driver 54 supplies the electric current to the coils 22 in accordance with this control signal. That is, the feedback-control with respect to the rotational speed of the output shaft 26 of the motor unit 10A is performed by the controller 50.

Thus, the output shaft 26, more specifically, a rotated body (e.g., the photoconductor drum) connected to the output shaft 26 is more precisely held to a set speed based on the rotation number command signal.

Here, in each of the outer rotor type motor 10, the rotation control unit 10B (constituting the outer rotor type motor 10) and the CPU 52 (constituting the rotation control unit 10B), the rotational speed of the output shaft 26 can be detected with high precision by executing the calculation of the formula (1) using the signals E1, E2, E3 from the three rotation sensors 40 arranged at 90 degree intervals in the circumferential direction (rotating direction) of the code wheel 36. That is, even when the code wheel 36, which serves as a sensing object for directly sensing the rotational speed through each rotation sensor 40 and which is attached to the output shaft 26, becomes eccentric (with displacement of the axis) with respect to the output shaft 26 or is elliptically deformed by distortion, the one-periodic component, which is a detection error caused by the eccentricity, and the two-periodic component, which is a detection error caused by the elliptical deformation, are both removed by the calculation of the formula (1). Therefore, the rotational speed of the output shaft 26 can be detected with high precision.

Figure 7:
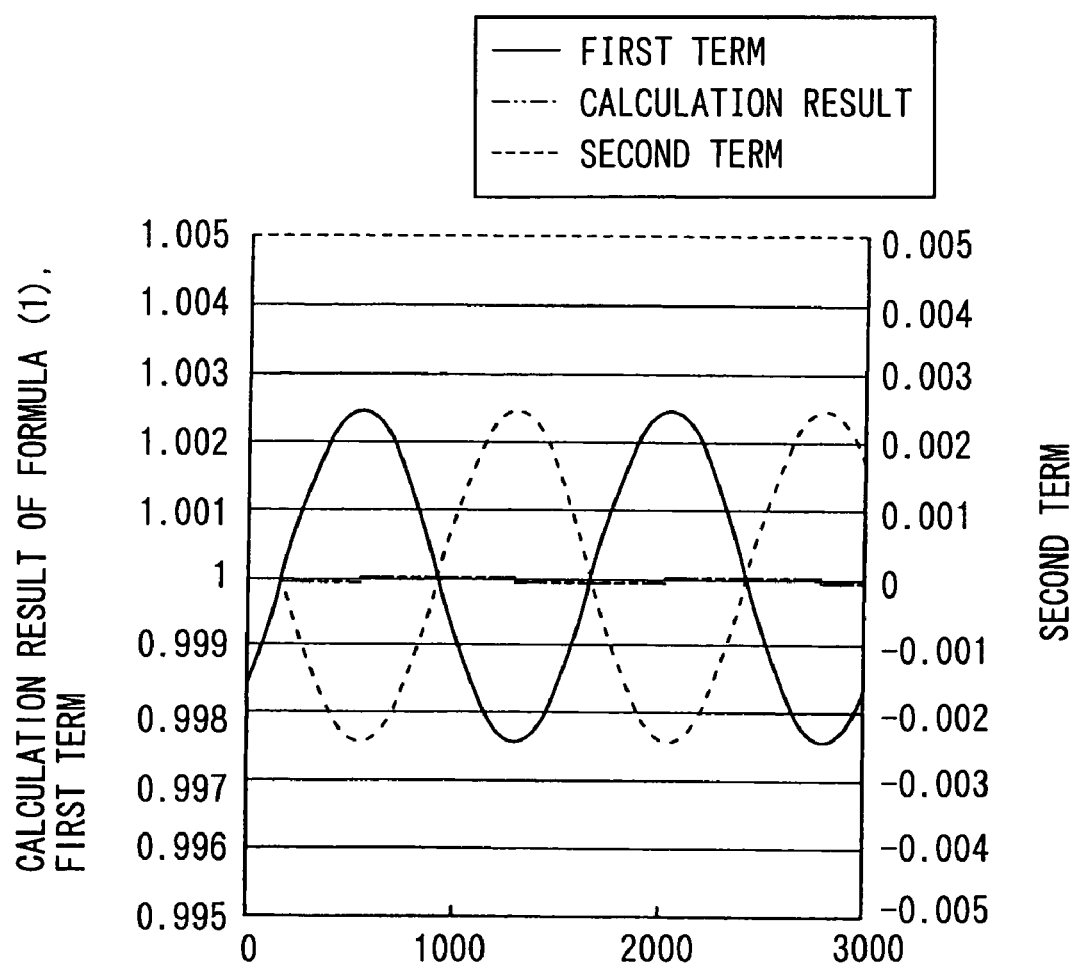
FIG. 7 is a diagram showing a rotational speed detecting result using an arithmetic operation of a CPU in the embodiment of the present invention.

More specifically, as shown in FIG. 7, the rotation measurement signal P(θ), which is an arithmetic result of the formula (1), is generally coincides with the reference pulse width 1 by overlapping the calculation result (the waveform of the right-hand side of the formula (4)) of the first term on the right-hand side of the formula (1) and the calculation result (the waveform in which a negative sign is added to the right-hand side of the formula (6)) of the second term on the right-hand side of the formula (1). Therefore, the rotation measurement signal P(θ) does not substantially include an error except for the true error included in the motor real rotational speed Me. Therefore, the CPU 52 can hold the rotational speed of the output shaft 26 to a constant speed based on a speed command signal with high accuracy by outputting the control signal to the driver 54 so as to set the motor real rotational speed Me to 1 (set the true error to zero).

In the case where the rotational speed (a set speed based on the rotation number command signal) of the output shaft 26 is approximately 90 rpm, when the rotation measurement signal P(θ), which is the arithmetic result obtained by the CPU 52, is processed through the Fast Fourier Transformation (FFT), each of the one-periodic component and the two-periodic component is reduced to a negligible extent (about 0.008% in the case of full amplitude, i.e., about 0.004% in the case of half amplitude), as shown in FIG. 8A. That is, the rotational speed of the output shaft 26 can be detected with very high accuracy practically having no problem by calculating the formula (1) using the signals E1, E2, E3 of the respective rotation sensors 40 by the CPU 52. FIG. 8B shows an FFT waveform provided by performing the Fast Fourier Transformation of the output signal (e.g., the raw waveform of E1) of one rotation sensor 40, which is shown for comparative purposes. It is known from FIG. 7B that both the one-periodic component and the two-periodic component are included in this output signal in a high ratio (the one-periodic component is about 0.04% and the two-periodic component is about 0.02% in one amplitude). Namely, the one-periodic component and the two-periodic component included in each of the signals E1, E2, E3 of the respective rotation sensors 40 are removed as shown in FIG. 8A by the calculation of the formula (1) executed by the CPU 52.

Thus, in this embodiment, in each of the outer rotor type motor 10, the rotation control unit 10B (constituting the outer rotor type motor 10) and the CPU 52 (constituting the rotation control unit 10B), in the detecting method for detecting the rotational speed, both the error component of one period in one rotation and the error component of two periods in one rotation of the code wheel 36 are removed (at the same time). Thus, the rotational speed of the output shaft 26, which serves as the sensing object having the code wheel 36 attached thereto, can be detected with high accuracy.

The generation of rotational fluctuations of the output shaft 26 (the rotated body such as the photoconductor drum, etc. connected to the output shaft 26) is prevented or greatly restrained by controlling the rotation of the output shaft 26 so as to set the motor real rotational speed Me to 1 by the control means. Furthermore, since the periodic component can be removed as mentioned above, the code wheel 36 used under a high temperature environment exceeding about 70 degrees Celsius can be constructed by cheap PET.

In the above embodiment, since the code wheel 36, which has 1500 slits 36A, is used, it is necessary to use a signal located before by 188 (≈750/4) pulses as data angularly located before by π/4 and substituted into E1 and E3 in the second term on the right-hand side of the formula (1). The one-periodic component is slightly left in the rotation measurement signal P(θ) (see FIG. 7). However, for example, the calculation of the formula (1) using the data located before by π/4 can be more accurately made by setting the number (pulse number per one rotation) of slits 36A to 1496 or 1504 as a multiple of 8, and the rotational speed of the output shaft 26 may be also more accurately detected.

Furthermore, for example, the CPU 52 can also remove both the one-periodic component and the two-periodic component by making the calculation using the formula (7) shown below instead of the formula (1).

$$P(\theta)=\{E1(\theta)+E2(\theta)\}/2+\{E2(\theta+\pi/2)+E3(\theta+\pi/2)\}/2 \quad \text{formula (7)}$$

In this formula (7), the first term on the right-hand side shows an average of the output signals E1, E2 of the rotation sensors 40A, 40B mutually having a phase difference of 90°. The second term on the right-hand side shows an average of the output signals E2, E3 of the rotation sensors 40B, 40C, which are phase shifted by 90 degrees from each other. Similar to the first term on the right-hand side of the formula (1), the two-periodic component is removed in each term. In the second term on the right-hand side of the formula (7), data angularly located before by π/2 (375 pulses) are used to coincide (accurately shift by 180 degrees) the phase to that in the first term on the right-hand side. Thus, the second term on the right-hand side becomes a waveform shown by the broken line in FIG. 7 while setting the sign to +1, and the one-periodic component is removed by overlapping the second term on the right-hand side with the first term on the right-hand side. Therefore, in the formula (7), it is prevented that the motor real rotational speed Me is also removed by calculating the difference between the first term and the second term on the right-hand side.

Thus, in the arithmetic formula of the CPU 52 when three rotation sensors 40 are arranged, the first correction signal removing the two-periodic component therefrom is obtained by adding the respective output signals of two rotation sensors 40 without being limited to the formula (1). The second correction signal removing the two-periodic component therefrom is obtained by subtracting or adding the respective output signals of two rotation sensors 40 in a combination different from that in the first correction signal. Any arithmetic formula may be also used if this arithmetic formula removes the one-periodic component by subtracting or adding the first correction signal and the second correction signal so as not to cancel the motor real rotational speed Me.

In particular, the code wheel 36, which forms the outer rotor type motor 10 and the rotation control unit 10B, has the optical pattern 37, which includes the light non-transmitting portions 36B and the 1500 slits 36A, the number of which is equal to or greater than 1000. Therefore, sensitivity (resolution) of each rotation sensor 40 with respect to the rotational speed of the output shaft 26 is relatively high, and the independent outputs E1, E2, E3 of the respective rotation sensors 40 are easily influenced by the eccentricity and the elliptical deformation of the code wheel 36 with respect to the output shaft 26. However, as mentioned above, both the one-periodic component due to the eccentricity and the two-periodic component due to the elliptical deformation are removed by performing the arithmetic operation using the three signals E1, E2, E3. Therefore, the rotational speed of the output shaft 26 can be detected with high rotation detecting accuracy (as required with respect to the resolution of the optical pattern 37) according to the number of slits 36A per one round. Thus, the operation of the output shaft 26 can be controlled with high precision (maintained at a set speed) on the basis of the rotational speed detecting result of this high accuracy.

Furthermore, in the optical pattern 37 of the code wheel 36, the number of slits 36A is set to 150 lines/inch or more. Therefore, both the one-periodic component and the two-periodic component of the code wheel 36 are removed, and the rotational speed of the output shaft 26, which serves as the sensing object having the code wheel 36 attached thereto, can be detected with high accuracy by applying the present invention to the encoders 34 of all practical kinds (a combination of each rotation sensor 40 and the code wheel, particularly, a transmission type photo interrupter).

Furthermore, in the present invention for removing the one-periodic component and the two-periodic component, the code wheel 36 can be made from the inexpensive PET as mentioned above. Since the PET is transparent resin, the optical pattern 37 can be easily obtained by printing the light non-transmitting portions 36B over the entire circumference at equal intervals in the circumferential direction of the code wheel 36 as mentioned above. Therefore, manufacture costs and material costs of the code wheel 36 also become inexpensive.

Next, a modification of the rotation control unit 10B, which constitutes the outer rotor type motor 10, will be explained. Components, which are similar to those of the above embodiment, are indicated by the same reference numerals and will not be described further.

Figure 9A:
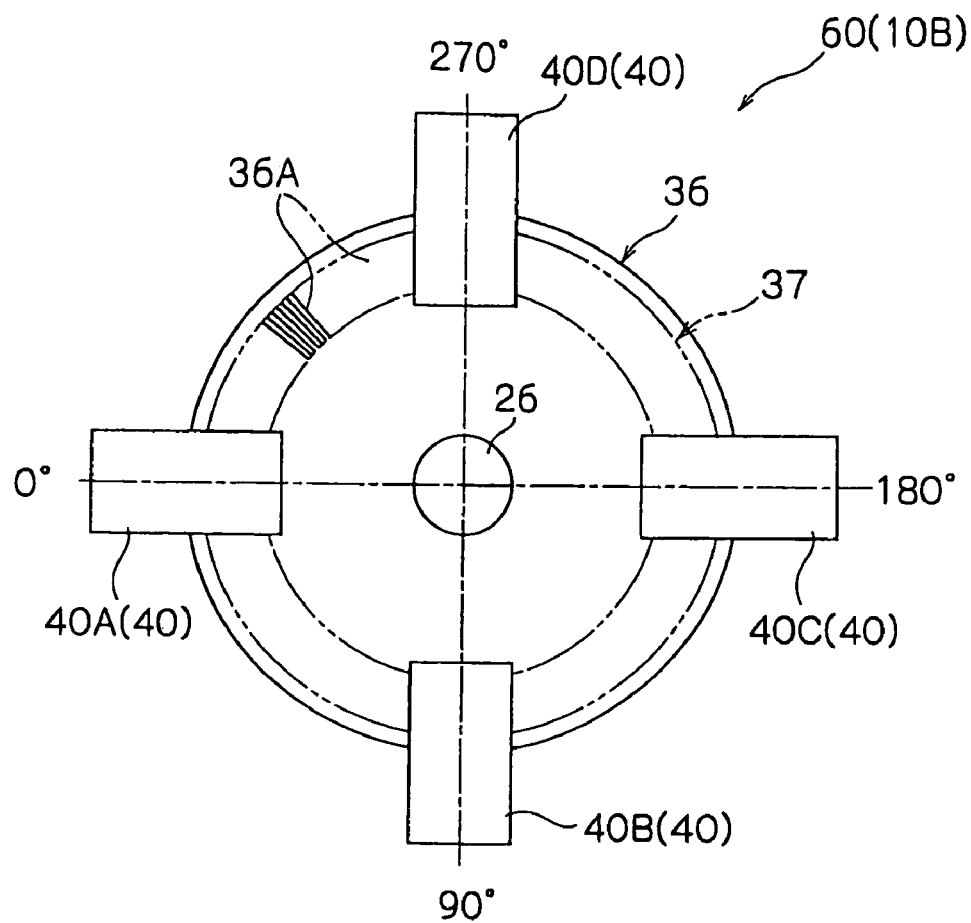
FIG. 9A is a front view showing an encoder in accordance with a modified example of the embodiment of the present invention.
Figure 9B:
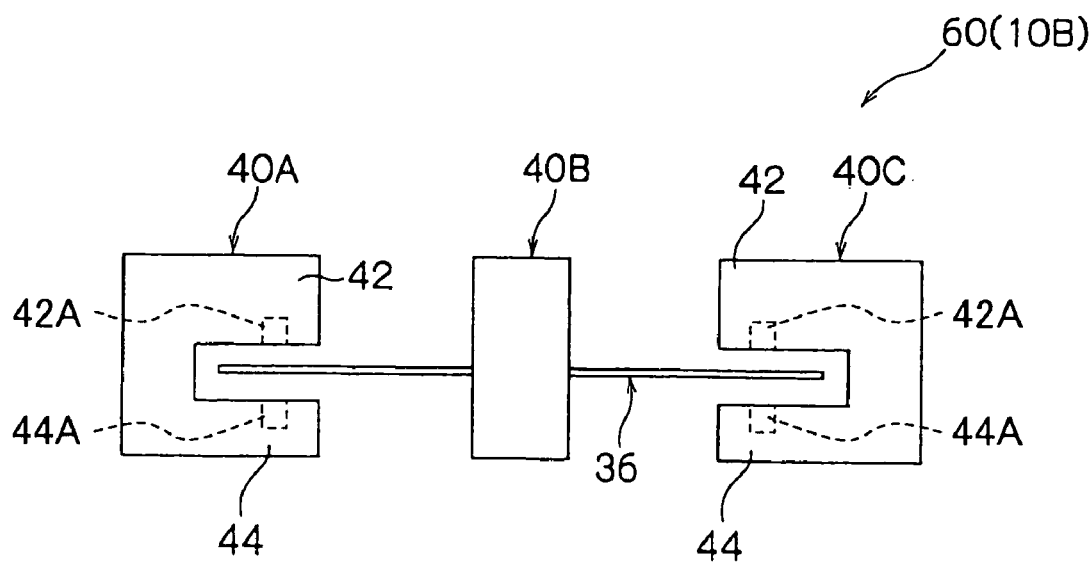
FIG. 9B is a side view showing the encoder of FIG. 9A.

As shown in FIG. 9A and FIG. 9B, the rotation control unit 10B in the modified example has an encoder 60 instead of the encoder 34. The encoder 60 differs from the encoder 34 in that four rotation sensors 40 are arranged. The respective rotation sensors 40 are arranged at 90 degree intervals in the circumferential direction of the code wheel 36. In this case, a substrate 46, to which each rotation sensor 40 is mounted, is divided to ease installation of the substrate 46 to the stator housing 18. In the following explanation, the rotation sensor 40, which is positioned at a relative position of 270 degrees, will be referred to as a fourth rotation sensor 40D, and an output signal of the fourth rotation sensor 40D will be referred to as E4.

On the other hand, in the CPU 52 of the controller 50, which constitutes the rotation control unit 10B of this modification, the formula (8) shown below is executably stored instead of the formula (1).

$$P(\theta)=\{E1(\theta)+E2(\theta)+E3(\theta)+E4(\theta)\}/4 \quad \text{formula (8)}$$

That is, the formula (8) is a formula for simply averaging the signals E1, E2, E3, E4 of the respective rotation sensors 40. Here, E1(θ), E2(θ) and E3(θ) are represented by the above formula (2), formula (3) and formula (5), and E4(θ) is represented by the following formula (9).

$$E4(\theta) = Ee(\theta + 3\pi/2) + Me(\theta) \quad \text{formula (9)}$$
$$= A\sin(\theta + 3\pi/2) + B\sin2(\theta + \alpha + 3\pi/2) + Me(\theta)$$

Accordingly, similar to the case of the formula (1), the one-periodic component and the two-periodic component are simultaneously removed from the rotation measurement signal P(θ) as an arithmetic result of the formula (8), and the rotation measurement signal $P(\theta)$ can include only the motor real rotational speed Me ($P(\theta)=Me(\theta)$). This can be understood as follows. That is, for example, the following first correction signal, from which the two-periodic component is removed, is calculated by $\{E1(\theta)+E2(\theta)\}$, i.e., overlapping the two signals, which are phase shifted from each other by 90 degrees.

$$E1(\theta)+E2(\theta)=2A\sin(\pi/4)\times\sin(\theta+\pi/4)+2Me(\theta) \quad \text{formula (10)}$$

Furthermore, the following second correction signal, from which the two-periodic component is removed, is calculated by $\{E3(\theta)+E4(\theta)\}$, i.e., overlapping the two signals, which are phase shifted from each other by 90 degrees.

$$E3(\theta)+E4(\theta)=2A\sin(\pi/4)\times\sin(\theta+3\pi/4)+2Me(\theta) \quad \text{formula (11)}$$

The one-periodic component is removed by overlapping (adding) the first correction signal and the second correction signal, which are phase shifted from each other by $\pi$(180 degrees).

Furthermore, for example, the formula (8) can be also understood as follows. That is, the following first correction signal, from which the one-periodic component is removed, is calculated by $\{E1(\theta)+E3(\theta)\}$, i.e., overlapping the two signals, which are phase shifted from each other by 180 degrees.

$$E1(\theta)+E3(\theta)=-2B\sin 2(\theta+\alpha+\pi/2)+2Me(\theta) \quad \text{formula (12)}$$

Furthermore, the following second correction signal, from which the one-periodic component is removed, is calculated by $\{E2(\theta)+E4(\theta))\}$, i.e., overlapping the two signals, which are phase shifted from each other by 180 degrees.

$$E2(\theta)+E4(\theta)=-2B\sin 2(\theta+\alpha+\pi/2)+2Me(\theta) \quad \text{formula (13)}$$

The two-periodic component is removed by overlapping (adding) the first correction signal and the second correction signal, which are phase shifted from each other by $\pi/2$ (90 degrees).

Thus, in accordance with the construction (detecting method of the rotational speed) in this modified example, both the one-periodic component and the two-periodic component are also removed, and the rotational speed of the output shaft 26 of the motor unit 10A can be detected with high precision. That is, advantages similar to those of the above embodiment can be obtained. Furthermore, in this modified example, the one-periodic component and the two-periodic component can be removed by using only data in real time. Therefore, it is not necessary for the CPU 52 to store data located before by $\pi/4$, and no error based on the number (pulse number per one rotation) of slits 36A is caused. Furthermore, the CPU 52, which receives the output signals of the encoder 60 having the four rotation sensors 40, may also calculate the rotation measurement signal $P(\theta)$ by executing the formula (1) or (7). In this case, the fourth rotation sensor 40D can be provided as a spare sensor.

Next, an example, in which the outer rotor type motor 10 of the above embodiment or the modified example, is applied to an image processor (image forming apparatus), such as a color printer, a color copying machine, will be described.

Figure 10:
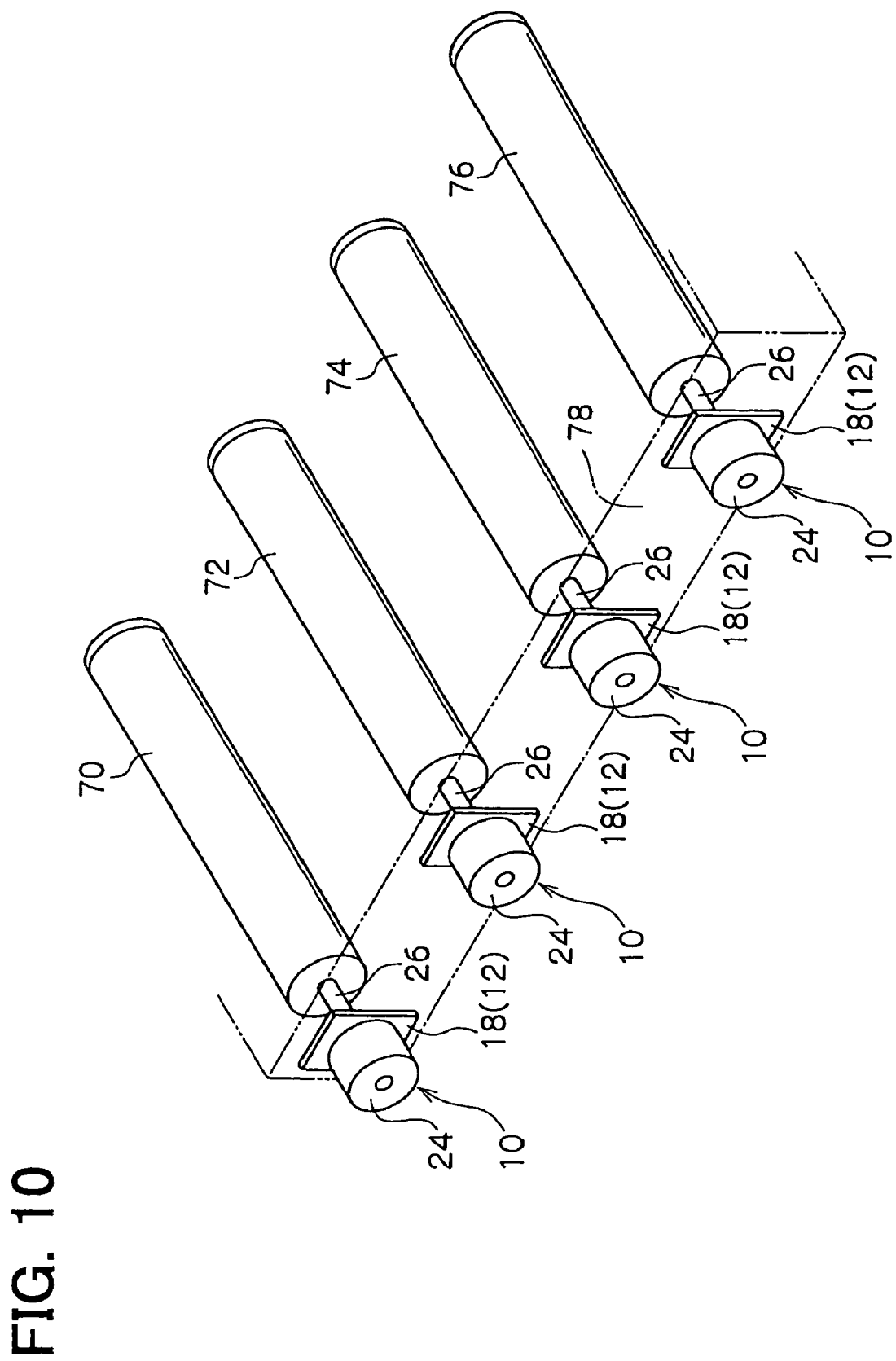
FIG. 10 is a schematic perspective view showing an application example to an image processor of the outer rotor type motor in the embodiment of the present invention or the modified example.
Figure 11A:
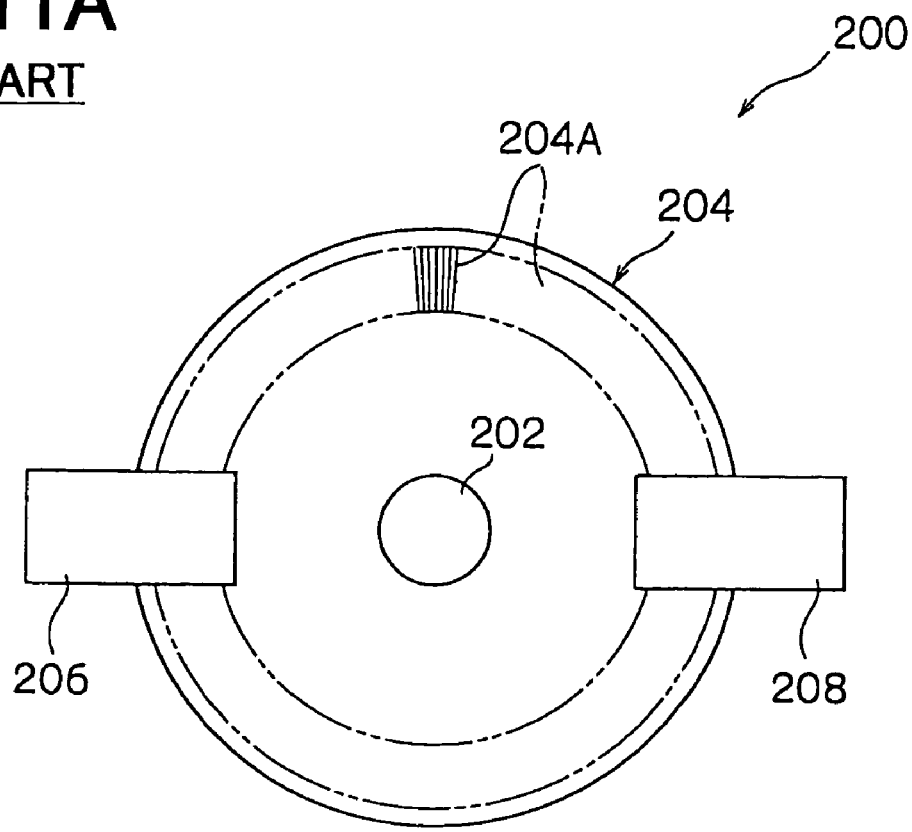
FIG. 11A is a front view showing a conventional encoder.
Figure 11B:
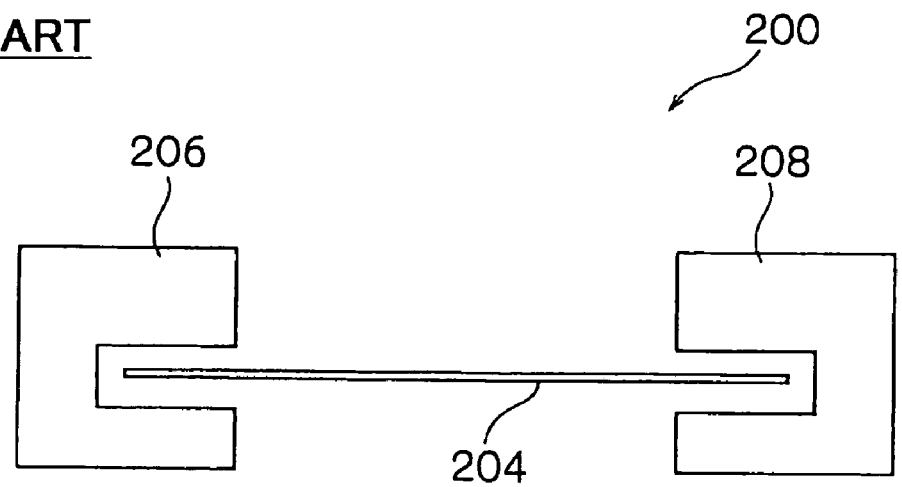
FIG. 11B is a side view of the encoder of FIG. 11A.

As shown in FIG. 10, the image processor has four photoconductor drums 70, 72, 74, 76, which correspond to red, blue, yellow and black, respectively. Each of the photoconductor drums 70, 72, 74, 76 transfers a formed toner image corresponding to each color to a transfer body by rotating the photoconductor drum around its axis. The outer rotor type motors 10, each of which serves as a rotation driving means, are connected to the photoconductor drums 70, 72, 74, 76, respectively. Specifically, the output shafts 26 of the outer rotor type motors 10 are directly connected integrally and rotatably to the photoconductor drums 70, 72, 74, 76, respectively. Each outer rotor type motor 10 is constructed such that the stator 12 (stator housing 18) is fixed to a housing 78 of the image processor, and the rotor 24 is rotated in a predetermined direction by supplying an electric current to the coils 22, so that each of the photoconductor drums 70, 72, 74, 76 is rotated.

Here, the outer rotor type motor 10 is compact and has characteristics for generating high torque in a low rotational speed range. Therefore, even when the outer rotor type motor 10 is directly connected to the photoconductor drum 70, etc. of the image processor, the outer rotor type motor 10 can rotate and operate the photoconductor drum 70, etc. with sufficient torque, and no image processor is large-sized. In particular, since the outer rotor type motor 10 has a thin type (flat) structure, the outer rotor type motor 10 is suitably arranged in a narrow space on the rear face (axial end portion) of each photoconductor drum 70, etc. Furthermore, since the outer rotor type motor 10 is a brushless motor having a magnet rotor as mentioned above, the outer rotor type motor 10 can be manufactured at low cost and no cost of the image processor is raised.

When such a compact outer rotor type motor 10 of high torque is directly connected to the photoconductor drum 70, etc., it is not necessary to rotate and operate the photoconductor drum 70, etc. through a gear and a belt, etc. Therefore, rotational irregularities of the photoconductor drum 70, etc. are restrained and image quality is improved. That is, the accuracy of the image processor is improved. In particular, since the outer rotor type motor 10 has three rotation sensors 40 (in the above embodiment) or four rotation sensors 40 (in the above modified example) and the rotational speed of the output shaft 26, i.e., of the photoconductor drum 70, etc. is controlled with high accuracy as mentioned above, the rotational irregularities of the photoconductor drum 70, etc. are further restrained.

Thus, in the outer rotor type motor 10 directly connected to the photoconductor drum 70, etc. of the image processor and rotating and operating the photoconductor drum 70, etc., the rotational irregularities of the photoconductor drum 70, etc. can be restrained without increasing the size of the image processor and its cost.

In the above embodiment and the modified example, the rotation control unit 10B (encoders 34, 60 and controller 50) constitutes the outer rotor type motor 10. However, the present invention is not limited to these embodiment and example. For example, the rotation control unit 10B (encoders 34, 60) may be attached to the photoconductor drum, etc. as a rotated body, and may be also constructed independently of the outer rotor type motor 10.

Furthermore, in the above embodiment and the modified example, it is preferably constructed such that the CPU 52 executably storing the arithmetic formulas (1), (8), etc. is mounted to the substrate 46 together with the driver 54. However, the present invention is not limited to this construction. For example, the CPU 52 (its function) as a rotation detecting circuit may be also assembled into a controller for controlling the operation of a device (the image processor, etc.) applying the outer rotor type motor 10 thereto. Furthermore, the arithmetic formulas (1), (8), etc. are not limited to the preferable construction executed by the CPU 52, but may be also calculated by an electric circuit (rotation detecting circuit) constructed by combining e.g., an adder, a subtracter, a delay circuit, etc.

Furthermore, in the above embodiment and the modified example, the one-periodic component and the two-periodic component at the rotational speed of the code wheel 36 are removed to hold the rotational speed of the output shaft 26 to a predetermined speed. However, the present invention is not limited to these embodiment and example. For example, the rotational angle of the code wheel 36 corresponding to the rotational angle of the output shaft 26 may be also detected with high precision. Accordingly, the outer rotor type motor 10, the controller 50 and the CPU 52 in the present invention are not limited to the case controlling the rotation number of the rotating drum by applying these members to the image processor, but can be applied to all uses.

Furthermore, in the above embodiment and the modified example, the encoders 34, 60 are constructed by the code wheel 36 having the slit 36A able to transmit light, and each rotation sensor 40 as a transmission type photo interrupter (optical type sensor). However, the present invention is not limited to these embodiment and example. For example, the present invention may be also constructed by arranging the photo interrupter of a reflection type as the encoder. Furthermore, the present invention can adopt various kinds of encoders of an electromagnetic type, a magneto resistance type, a Hall effect type, etc.

Furthermore, in the above embodiment and the modified example, the brushless outer rotor type motor 10 is adopted as the motor, but the present invention is not limited to this brushless outer rotor type motor 10. For example, it is also possible to adopt a motor of any form such as an inner rotor type motor, a motor having a brush, an alternating current motor, etc. as the motor.

Additional advantages and modifications will readily occur to those skilled in the art. The invention in its broader terms is therefore not limited to the specific details, representative apparatus, and illustrative examples shown and described.

What is claimed is:

1. A rotating machine comprising:
a rotatable shaft;
a sensing object member that is disk-shaped and is rotated integrally with the rotatable shaft;
at least three rotation sensing devices, which are placed adjacent to the sensing object member and are arranged one after another at 90 degree intervals in a circumferential direction of the sensing object member, wherein each rotation sensing device generates an output signal, which corresponds to one of a rotational speed and a rotational angle of the sensing object member; and
a control means for controlling one of a rotational speed and a rotational angle of the rotatable shaft based on a rotation measurement signal, which is obtained from the output signals of the at least three rotation sensing devices in such a manner that a two-periodic error component and a one-periodic error component are both eliminated from the rotation measurement signal, wherein:
the control means computes a first correction signal based on the respective output signals of corresponding two of the at least three rotation sensing devices in such a manner that the two-periodic error component is eliminated from the first correction signal;
the control means computes a second correction signal based on the respective output signals of corresponding two of the at least three rotation sensing devices in such a manner that the two-periodic error component is eliminated from the second correction signal; and
the control means computes the rotation measurement signal based on the first correction signal and the second correction signal in such a manner that the one-periodic error component is eliminated from the rotation measurement signal.

2. The rotating machine according to claim 1, wherein:
the control means eliminates the two-periodic error component from the first correction signal by adding the output signal of one of the corresponding two of the at least three rotation sensing devices, which correspond to the first correction signal, to the output signal of the other one of the corresponding two of the at least three rotation sensing devices, which correspond to the first correction signal;
the control means eliminates the two-periodic error component from the second correction signal by adding or subtracting the output signal of one of the corresponding two of the at least three rotation sensing devices, which correspond to the second correction signal, to or from the output signal of the other one of the two of the at least three rotation sensing devices, which correspond to the second correction signal; and
the control means eliminates the one-periodic error component from the rotation measurement signal by adding or subtracting the second correction signal to or from the first correction signal upon respectively coinciding a phase and an amplitude of the second correction signal with a phase and an amplitude of the first correction signal.

3. The rotating machine according to claim 1, wherein:
the corresponding two of the at least three rotation sensing devices, which correspond to the first correction signal, are spaced 90 degrees from one another;
the corresponding two of the at least three rotation sensing devices, which correspond to the second correction signal, are spaced 180 degrees from one another; and
the control means eliminates the two-periodic error component from the second correction signal by subtracting the output signal of the one of the corresponding two of the at least three rotation sensing devices, which correspond to the second correction signal, from the output signal of the other one of the corresponding two of the at least three rotation sensing devices, which correspond to the second correction signal; and
the control means eliminates the one-periodic error component from the rotation measurement signal by subtracting the second correction signal from the first correction signal upon coinciding the phase and the amplitude of the second correction signal with the phase and the amplitude of the first correction signal.

4. A rotating machine comprising:
a rotatable shaft;
a sensing object member that is disk-shaped and is rotated integrally with the rotatable shaft;
at least three rotation sensing devices, which are placed adjacent to the sensing object member and are arranged one after another at 90 degree intervals in a circumferential direction of the sensing object member, wherein each rotation sensing device generates an output signal, which corresponds to one of a rotational speed and a rotational angle of the sensing object member; and
a control means for controlling one of a rotational speed and a rotational angle of the rotatable shaft based on a rotation measurement signal, which is obtained from the output signals of the at least three rotation sensing devices in such a manner that a two-periodic error component and a one-periodic error component are both eliminated from the rotation measurement signal, wherein:

the at least three rotation sensing devices includes first to third rotation sensing devices; and the control means computes the rotation measurement signal according to the following formula:

$$P(\theta)=\{E1(\theta)+E2(\theta)\}/2-\sqrt{2}/4\times\{E1(\theta+\pi/4)-E3(\theta+\pi/4)\}$$

where: $P(\theta)$ denotes the rotation measurement signal;

E1 denotes the output signal of the first rotation sensing device;

E2 denotes the output signal of the second rotation sensing device, which is spaced 90 degrees from the first rotation sensing device in the circumferential direction; and E3 denotes the output signal of the third rotation sensing device, which is spaced 180 degrees from the first rotation sensing device in the circumferential direction.

5. A rotating machine comprising:

a rotatable shaft;

a sensing object member that is disk-shaped and is rotated integrally with the rotatable shaft;

at least three rotation sensing devices, which are placed adjacent to the sensing object member and are arranged one after another at 90 degree intervals in a circumferential direction of the sensing object member, wherein each rotation sensing device generates an output signal, which corresponds to one of a rotational speed and a rotational angle of the sensing object member; and a control means for controlling one of a rotational speed and a rotational angle of the rotatable shaft based on a rotation measurement signal, which is obtained from the output signals of the at least three rotation sensing devices in such a manner that a two-periodic error component and a one-periodic error component are both eliminated from the rotation measurement signal, wherein:

the at least three rotation sensing devices includes first to third rotation sensing devices; and the control means computes the rotation measurement signal according to the following formula:

$$P(\theta)=\{E1(\theta)+E2(\theta)\}/2+\{E2(\theta+\pi/2)+E3(\theta+\pi/2)\}/2$$

where: $P(\theta)$ denotes the rotation measurement signal;

E1 denotes the output signal of the first rotation sensing device;

E2 denotes the output signal of the second rotation sensing device, which is spaced 90 degrees from the first rotation sensing device in the circumferential direction; and E3 denotes the output signal of the third rotation sensing device, which is spaced 180 degrees from the first rotation sensing device in the circumferential direction.

6. The rotating machine according to claim 1, wherein: the at least three rotation sensing devices includes first to fourth rotation sensing devices; and the control means computes the rotation measurement signal according to the following formula:

$$P(\theta)=\{E1(\theta)+E2(\theta)+E3(\theta)+E4(\theta)\}/4$$

where: $P(\theta)$ denotes the rotation measurement signal;

E1 denotes the output signal of the first rotation sensing device;

E2 denotes the output signal of the second rotation sensing device, which is spaced 90 degrees from the first rotation sensing device in the circumferential direction;

E3 denotes the output signal of the third rotation sensing device, which is spaced 180 degrees from the first rotation sensing device in the circumferential direction; and E4 denotes the output signal of the fourth rotation sensing device, which is spaced 270 degrees from the first rotation sensing device in the circumferential direction.

7. The rotating machine according to claim 1, wherein the rotating machine is an electric motor.

8. The rotating machine according to claim 7, wherein:

the motor is for driving a photoconductor drum; and the rotatable shaft is connected to the photoconductor drum to rotate integrally with the photoconductor drum.

9. The rotating machine according to claim 1, wherein:

each of the at least three rotation sensing devices is an optical rotation sensing device, which has a light emitter and a light receiver, wherein the light receiver is spaced away from and is opposed to the light emitter to receive light emitted from the light emitter;

the sensing object member is a resin code wheel that has an optical pattern, wherein the optical pattern includes a plurality of light conducting portions and a plurality of light shading portions, which are arranged alternately in the circumferential direction of the code wheel along an entire perimeter of the code wheel;

when each light conducting portion is placed between the light emitter and the light receiver of each optical rotation sensing device, the light conducting portion conducts the light emitted from the light emitter toward the light receiver; and when each light shading portion is placed between the light emitter and the light receiver of each optical rotation sensing device, the light shading portion shades the light emitted from the light emitter relative to the light receiver to disable sensing of the emitted light by the light receiver.

10. The rotating machine according to claim 9, wherein the plurality of light conducting portions includes 1000 light conducting portions or more.

11. The rotating machine according to claim 9, wherein a density of the plurality of light conducting portions is set in such a manner that 150 light conducting portions or more exist per a circumferential length of 25.4 mm.

12. The rotating machine according to claim 9, wherein the resin code wheel is made of polyethylene terephthalate.

* * * * *